(12) United States Patent
Du

(10) Patent No.: US 11,049,144 B2
(45) Date of Patent: Jun. 29, 2021

(54) REAL-TIME IMAGE AND SIGNAL PROCESSING IN AUGMENTED REALITY BASED COMMUNICATIONS VIA SERVERS

(71) Applicant: Integem Inc., Cupertino, CA (US)

(72) Inventor: Eliza Yingzi Du, Cupertino, CA (US)

( * ) Notice: Subject to any disclaimer, the term of this patent is extended or adjusted under 35 U.S.C. 154(b) by 15 days.

(21) Appl. No.: 16/719,922

(22) Filed: Dec. 18, 2019

(65) Prior Publication Data

US 2020/0134670 A1    Apr. 30, 2020

Related U.S. Application Data

(62) Division of application No. 15/479,269, filed on Apr. 4, 2017, now Pat. No. 10,580,040.

(60) Provisional application No. 62/317,554, filed on Apr. 3, 2016, provisional application No. 62/322,358, filed on Apr. 14, 2016.

(51) Int. Cl.
| | |
|---|---|
| *G06Q 30/00* | (2012.01) |
| *G06Q 30/02* | (2012.01) |
| *G06K 9/00* | (2006.01) |
| *G06K 9/46* | (2006.01) |
| *G06T 19/00* | (2011.01) |
| *G06T 19/20* | (2011.01) |
| *H04N 7/15* | (2006.01) |

(52) U.S. Cl.
CPC ..... *G06Q 30/0261* (2013.01); *G06K 9/00671* (2013.01); *G06K 9/00711* (2013.01); *G06K 9/46* (2013.01); *G06Q 30/0241* (2013.01); *G06Q 30/0271* (2013.01); *G06Q 30/0276* (2013.01); *G06T 19/006* (2013.01); *G06T 19/20* (2013.01); *G06Q 30/0269* (2013.01); *H04N 7/15* (2013.01)

(58) Field of Classification Search
CPC .......... G06Q 30/0261; G06Q 30/0241; G06Q 30/0271; G06Q 30/0276; G06Q 30/0269
USPC .......................................... 345/419
See application file for complete search history.

(56) References Cited

U.S. PATENT DOCUMENTS

| | | | |
|---|---|---|---|
| 2009/0033737 A1* | 2/2009 | Goose ................... | G06F 3/0481 348/14.07 |
| 2012/0206452 A1* | 8/2012 | Geisner ................ | G02B 27/017 345/419 |
| 2015/0091891 A1* | 4/2015 | Raheman ................ | A63G 31/16 345/419 |
| 2015/0123965 A1* | 5/2015 | Molyneaux ............. | G06T 19/20 345/419 |

(Continued)

*Primary Examiner* — Jin Ge

(57) ABSTRACT

Disclosed herein are methods and systems for combining, in real time, images of one or more real life objects that have been captured in real time based on a comprehensive characteristic-based mechanism with a virtual environment to provide an augmented reality environment to a user or user device. In particular, the captured images are provided to a remote server that is capable of performing the processing steps to create a plurality of integrated images. The plurality of integrated images can then be provided to the user device. Advantageously, the remote server can create the plurality of integrated images much more quickly due to the server's enhanced computing power and storage space as compared to the user device. The remote server may be an intermediate server between multiple user devices. The comprehensive content matching mechanism is based on a plurality of factors comprising advertisement content, user preference information, and context information.

20 Claims, 16 Drawing Sheets

(56) References Cited

U.S. PATENT DOCUMENTS

| | | | | |
|---|---|---|---|---|
| 2015/0264296 A1* | 9/2015 | Devaux | ............... | H04N 5/77 386/226 |
| 2016/0019718 A1* | 1/2016 | Mukkamala | ............ | G06F 3/011 345/419 |
| 2016/0198097 A1* | 7/2016 | Yewdall | ................ | H04N 5/265 348/659 |

* cited by examiner

REAL-TIME IMAGE AND SIGNAL PROCESSING IN AUGMENTED REALITY BASED COMMUNICATIONS VIA SERVERS

CROSS-REFERENCE TO RELATED APPLICATION

This application is a divisional of U.S. patent application Ser. No. 15/479,269, filed on Apr. 4, 2017 and entitled "Methods and Systems for Real-Time Image and Signal Processing in Augmented Reality Based Communications," which claims priority to U.S. Provisional Patent Application No. 62/317,554, filed on Apr. 4, 2016 and entitled "A Real-time Image and Signal Processing System for Augmented Reality-based Communication," and to U.S. Provisional Patent Application No. 62/322,358, filed on Apr. 14, 2016 and entitled "A Real-time Immersive Advertisement System Using Augmented Reality-based Communication," each of which is hereby incorporated by reference herein in its entirety.

TECHNICAL FIELD

The disclosure generally relates to systems, devices and methods for image and signal processing for communications based on an augmented reality (AR) system.

BACKGROUND

AR-based real-time communication systems or methods are known. For example, Apple Photobooth™ allows users to create photos or videos of themselves in a virtual environment. Sometimes, the virtual environment can be a moving environment. Google Hangout™, an audio and video conference platform, allows users to select desired individualized background during a video conference session and allows users to wear exchangeable virtual items such as hats, glasses and mustache. However, such existing systems are crude and primitive from a visual perspective. Often there are obvious and sometimes significant gaps and imperfections at locations where a real life object (a user on Google Hangout™) interfaces with a virtual item (e.g., a virtual background and a wearable decorative item). Such defects are more pronounced where a virtual environment includes moving elements.

Under some situation, professional photographers or film makers use green screens for initial image or video capturing to minimize defects. Extensive editing is needed at a later time to replace the monotone background to a virtual environment. This is very time consuming and expensive process. During video conferences (such as Google Hangout™), people with different language may also get lost and result in ineffective communication.

What is needed in the art are improved systems and methods for real-time processing image and other signals (such as audio signals) for AR-based communications.

SUMMARY

Disclosed herein are methods and systems for systems, devices and methods for image and signal processing for communications based on an augmented reality (AR) system.

In one aspect, disclosed herein is a method of integrating a real life object with a virtual environment. The method comprises the steps of providing, at a computer device and in real-time, multi-dimensional image information of a real life object, where the image information is extracted by separating the real life object from its actual environment in one or more images that are captured in real-time using a comprehensive characteristic-based mechanism; receiving, at the computer device and in real-time, a selection of a virtual environment constructed from a plurality of images; providing, at the computer device and in real-time, image relations between each pixel of the image information of the real life object and a corresponding pixel of each image of the plurality of images of the virtual environment, where the image relations comprise at least a depth relation or a transparency relation; and rendering, at the computer device and in real-time, a plurality of integrated images, where each pixel in an integrated image is divided into multiple layers, and where each layer is determined using corresponding pixels in the image information of the real life object and each image of the plurality of images of the virtual environment based on the image relations.

In some embodiments, the method steps take place on a user device or a server, or any computer device.

In some embodiments, the method further comprises a step of extracting in real-time, at the same computer device or a different computer device, the multiple dimensional image information of the real life object from the one or more images of the real life object in its actual environment.

In some embodiments, the comprehensive characteristic-based mechanism is based on one or more differences in a characteristic between the real life object and the actual environment, the characteristic comprising a visual characteristic of the real life object or the actual environment captured in the video clip, a real-time learned characteristic of the real life object or the actual environment, or a pre-learned feature relating to the real life object or the actual environment.

In some embodiments, the visual characteristic comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

In some embodiments, the spatial characteristic comprises a three-dimensional spatial characteristic.

In some embodiments, the real-time learned characteristic comprises color, shape, edge, light reflectance, light illuminance, exposure, brightness, shadow, highlight, contrast, blackpoint, motion, depth, material, contrast, or combinations thereof.

In some embodiments, the pre-learned feature comprises color, shape, edge, light reflectance, light illuminance, exposure, brightness, shadow, highlight, contrast, blackpoint, motion, depth, material, contrast, or combinations thereof.

In some embodiments, the exacting comprises a round of rough extraction and a round of fine extraction.

In some embodiments, the method further comprises a step of constructing, at the computer device or a different computer device, the virtual environment from the plurality of images.

In some embodiments, at least one image of the plurality of images is modified when being used to construct the virtual environment.

In some embodiments, the at least one image is modified m size, shape, image quality, color, light, perspective, visual effect, or combinations thereof.

In some embodiments, the method further comprises a step of integrating, at the computer device or a different computer device in real-time and on a pixel by pixel basis, the image information of the real life object and each image of the plurality of images of the virtual environment based on the image relations to create the plurality of integrated images.

In some embodiments, the multiple layers of a pixel comprises a foreground layer, an intermediate layer, and a background layer.

In some embodiments, the foreground layer is determined before the intermediate layer or background layer.

In some embodiments, one or more advertisement elements are embedded m the plurality of integrated images.

In some embodiments, the one or more advertisement elements are associated with the extracted image information of the real life object, the virtual environment, or combinations thereof.

In one aspect, disclosed herein is a method of integrating two real life objects with a virtual environment. The method comprises the steps of providing, at a computer device and in real-time, multi-dimensional image information of a first real life object, where the image information is extracted by separating the first real life object from a first actual environment in one or more images that are captured in real-time using a comprehensive characteristic-based mechanism; receiving, at the computer device and in real-time, a selection of a virtual environment constructed from a plurality of images; providing, at the computer device and in real-time, image relations between each pixel of the image information of the real life object and a corresponding pixel of each image of the plurality of images of the virtual environment, where the image relations comprise at least a depth relation or a transparency relation; providing, at the computer device and in real-time, extracted multi-dimensional image information of a second real life object, and new image relations between each pixel of the image information of the second real life object and a corresponding pixel of each image of the plurality of images of the virtual environment, where the new image relations comprise at least a depth relation or a transparency relation; and rendering, at the computer device and in real-time, a plurality of integrated images, where each pixel in an integrated image is divided into multiple layers, and where each layer is determined using corresponding pixels in the image information of the first real life object, the second real life object, and each image of the plurality of images of the virtual environment based on the image relations and new image relations.

In one aspect, disclosed herein is a computer system. The system comprises one or more processors; and a memory accessible to the one or more processors. The memory stores instructions executable by the one or more processors to perform the following steps: provide, at a computer device and in real-time, multi-dimensional image information of a real life object, where the image information is extracted by separating the real life object from its actual environment in one or more images that are captured in real-time using a comprehensive characteristic-based mechanism; receive, at the computer device and in real-time, a selection of a virtual environment constructed from a plurality of images; provide, at the computer device and in real-time, image relations between each pixel of the image information of the real life object and a corresponding pixel of each image of the plurality of images of the virtual environment, where the image relations comprise at least a depth relation or a transparency relation; and render, at the computer device and in real-time, a plurality of integrated images, where each pixel in an integrated image is divided into multiple layers, and where each layer is determined using corresponding pixels in the image information of the real life object and each image of the plurality of images of the virtual environment based on the image relations.

In some embodiments, the memory stores further instructions executable by the one or more processors to: extract in real-time, at the computer device or a different computer device, the multiple dimensional image information of the real life object from the one or more images of the real life object in its actual environment.

In some embodiments, the memory stores further instructions executable by the one or more processors to: construct, at the computer device or a different computer device, the virtual environment from the plurality of images.

In some embodiments, the memory stores further instructions executable by the one or more processors to: integrate, at the computer device or a different computer device in real-time and on a pixel by pixel basis, the image information of the real life object and each image of the plurality of images of the virtual environment based on the image relations to create the plurality of integrated images.

In some embodiments, the memory stores further instructions executable by the one or more processors to: provide, at the computer device and in real-time, new image relations between each pixel of the image information of a second real life object and a corresponding pixel of each image of the plurality of images, where the new image relations comprise at least a depth relation or a transparency relation.

In some embodiments, the memory stores further instructions executable by the one or more processors to integrate, at the computer device or a different computer device in real-time and on a pixel by pixel basis, the image information of the real life object, the new image information of the second real life object, and each image of the plurality of images of the virtual environment based on the image relations and new image relations to create a plurality of new integrated images.

In some embodiments, one or more advertisement elements are embedded m the plurality of integrated images.

In some embodiments, the one or more advertisement elements are associated with the extracted image information of the first real life object, the extracted image information of the second real life object, the virtual environment, or combinations thereof.

It will be understood that the method and system disclosed herein are applicable to more than two real life objects as well.

In one aspect, disclosed herein is a non-transitory computer-readable medium containing instructions that, when executed by a computer processor, cause the computer processor to: provide, at a computer device and in real-time, multi-dimensional image information of a real life object, where the image information is extracted by separating the real life object from its actual environment in one or more images that are captured in real-time using a comprehensive characteristic-based mechanism; receive, at the computer device and in real-time, a selection of a virtual environment constructed from a plurality of images; provide, at the computer device and in real-time, image relations between each pixel of the image information of the real life object and a corresponding pixel of each image of the plurality of images of the virtual environment, where the image relations comprise at least a depth relation or a transparency relation; and render, at the computer device and in real-time, a plurality of integrated images, where each pixel in an integrated image is divided into multiple layers, and where each layer is determined using corresponding pixels in the image information of the real life object and each image of the plurality of images of the virtual environment based on the image relations.

In some embodiments, the non-transitory computer-readable medium contains further instructions executable by the one or more processors to: extract in real-time, at the computer device or a different computer device, the multiple dimensional image information of the real life object from the one or more images of the real life object in its actual environment.

In some embodiments, the non-transitory computer-readable medium contains further instructions executable by the one or more processors to: construct, at the computer device or a different computer device, the virtual environment from the plurality of images.

In some embodiments, the non-transitory computer-readable medium contains further instructions executable by the one or more processors to: integrate, at the computer device or a different computer device in real-time and on a pixel by pixel basis, the image information of the real life object and each image of the plurality of images of the virtual environment based on the image relations to create the plurality of integrated images.

In some embodiments, the non-transitory computer-readable medium contains further instructions executable by the one or more processors to: provide, at the computer device and in real-time, new image relations between each pixel of the image information of a second real life object and a corresponding pixel of each image of the plurality of images, where the new image relations comprise at least a depth relation or a transparency relation.

In some embodiments, the non-transitory computer-readable medium contains further instructions executable by the one or more processors to: integrate, at the computer device or a different computer device in real-time and on a pixel by pixel basis, the image information of the real life object, the new image information of the second real life object, and each image of the plurality of images of the virtual environment based on the image relations and new image relations to create a plurality of new integrated images.

It would be understood that any embodiments disclosed herein can be applied, when applicable, in any aspect of the invention, alone or in any combination.

Details of one or more implementations are set forth in the accompanying drawings and the description below. Other features, aspects, and potential advantages will be apparent from the description and drawings, and from the claims.

DESCRIPTION OF DRAWINGS

Those of skill in the art will understand that the drawings, described below, are for illustrative purposes only. The drawings are not intended to limit the scope of the present teachings in any way.

Like reference symbols in the various drawings indicate like elements.

DETAILED DESCRIPTION

Overview

Figure 1A:
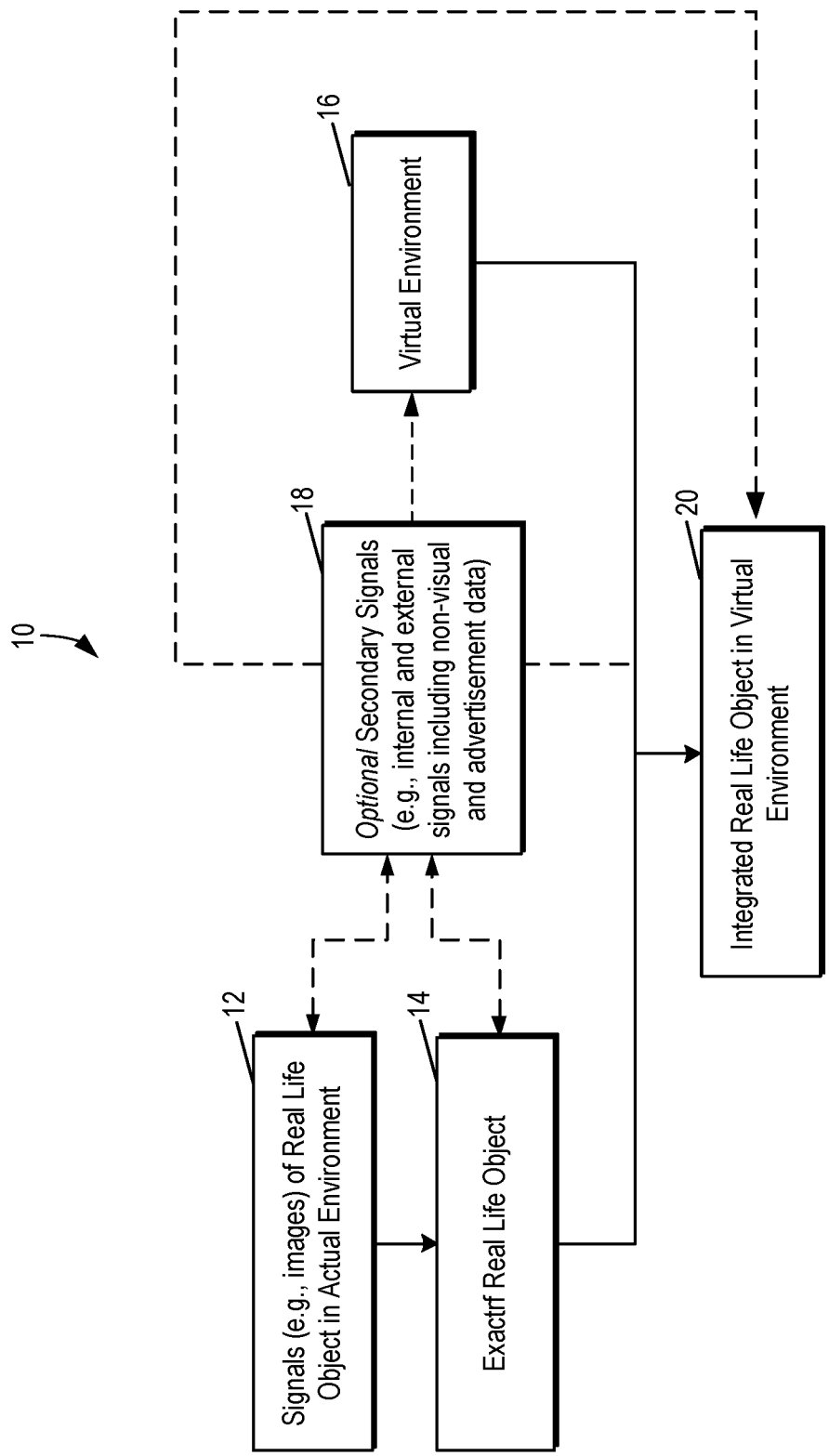
FIG. 1A depicts a block diagram of an example system for performing real-time image and signals processing.

FIG. 1A illustrates elements that are present in an exemplary AR-based real-time image and signal processing system 10. Signals such as images of a real life object are captured while the real life object is physically located in an actual environment (e.g., block 12). The captured images are then processed in real-time to extract image information of the real life object (e.g., block 14). A virtual environment (e.g., block 16) can be constructed previously or concurrently while the real life object is being extracted. The extracted real life object is then integrated with the selected virtual environment. Optional secondary signals such as non-visual signals or advertisement element can be added to any elements in system 10. The entire process can take place in real-time while images of the real life object are being captured, although in some embodiments, certain virtual environment elements can be constructed before-hand.

As disclosed herein, the term "real-time" refers to functionalities being performed without little or no delay in time. For example, image extraction occurs in real-time when an image is being processed as soon as or shortly after the image has been captured. In some embodiments, the delay can be within a minute or within seconds. In some embodiments, the delay may be caused by hardware limit such as the speed of data transfer or image processing.

As disclosed herein, the terms "real life object" and "user" are sometimes used interchangeably. In some embodiments, the user is the real life object. In some embodiments, the user is an operator of the computer device and controls one or more of the functionalities including image capture.

As disclosed herein, the term "images" can be used to refer to separate photos taken at discontinuous time points or image frames in a video. Unless otherwise specified, the terms "images" and "video" can be used interchangeably. A video is effectively a collection of multiple images that are captured continuously.

As disclosed herein, the terms "signals" and "data" cam be used interchangeably. For example, they can include image, audio, video, text, spatial, geographical, or any other information associated with the real life object. They also include metadata or other embedded information that reflect a state of the real life object. They can further include data that are indirectly associated with the real life object, for example, information such as images or videos that reflect the geolocation of the real life object. As disclosed herein, "signals" and "data" can include internal and/or external data. Here, internal data refer to those collected during the real-time capture of the real life object in its actual environment, including visual, audio and other types of information. External data refer to content beyond those collected in real-time, including but not limited to data already stored on a local user device, data from another user device (accessible via network connection), data stored on a server (e.g., including advertisement elements stored on an advertisement provisioning server), or data retrieved in real-time using network collection. Most examples disclosed herein refer to images, which, however, should not in anyway limit the scope of the invention.

As disclosed herein "secondary signals" are signals or data in other than those reflecting the real life object itself. Secondary signals can also include internal or external data. In some embodiments, secondary signals include non-visual signals such as audio sound track or external audio files. In some embodiments, secondary signals include advertisement elements that can be incorporated with the extracted real life object, the virtual environment, or the final integrated images or videos.

At block 12, signals (e.g., images or audio) of a real life object is being captured, using, for example, a user device with an image/audio capturing device such as a camera. In some embodiments, the camera is an integral part of the user device. In some embodiments, the camera is an external hardware component that can be connected to the user device. In some embodiments, the user device is a network-enabled camera. Preferably, the camera is a depth camera. In some embodiment, the image/audio capturing device includes a set of cameras. As disclosed herein, the user device should be equipped with a CPU/GPU processor, a camera, a mic phone, a display, a speaker, a communication unit, and a storage. It includes but is not limited to a desktop computer, a laptop computer, a smartphone device, a personal digital associates, a network-enabled camera, a tablet, an AR glass, an AR hamlet, a VR glass, a smart TV, and etc. The camera can be a 3D camera, a regular RGB camera, an IR camera, a multiple spectrum camera, a hyperspectral camera, a 360 degree camera etc.

In some embodiments, the real life object is a person. In some embodiments, the real life object is an animal or an object. In some embodiments, a plurality of images is taken of the real life object. In some embodiments, the images are taken continuously and form a video. In all embodiments, the computer device for capturing image of the real life object is accessible to the real life object or a user of the computer device.

As disclosed herein, the real life object can be in any environment when images are being captured. There are no special requirements for the environment for image capturing. For example, a background screen of a uniform or near uniform color is not needed. In most embodiments, images of the real life object are capture as is when the real life object is in its actual physical environment. In some embodiments, images of the real life object are taken while the real life object is carrying out regular activities.

At block 14, while the images are being capture, image information of the real life object is extracted. In some embodiments, extraction is performed by separating the real life object from its actual environment, based on one or more differences in a characteristic between the real life object and the actual environment. In some embodiments, the characteristic can be a visual characteristic, including but not limited to a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

In some embodiments, the visual characteristic comprise a three-dimensional spatial characteristic.

In some embodiments, the characteristic can be a real-time learned or a pre-learned feature relating to the real life object or the actual environment. A real-time learned or pre-learned characteristic includes but is not limited to, for example, color, shape, edge, light reflectance, light illuminance, motion, depth, material, contrast, or combinations thereof.

In some embodiments, extraction of the real life object is done on an image-by-image basis. This also applies to video extraction, which is done on a frame-by-frame basis. In some embodiments, multiple images are processed in parallel at the same time.

At block 16, a virtual environment is provided. In some embodiments, the virtual environment can be constructed prior to image extraction or even image capture. In some embodiments, the virtual environment can be constructed concurrently as image extract or image capture.

In some embodiments, the virtual environment is different from the actual environment. In some embodiments, the virtual environment is a modified version of the actual environment. In any embodiments, images for constructing the virtual environment can be modified image characteristics including but not limited size, shape, image quality, color, perspective, light, visual effect, or combinations thereof.

In some embodiments, the virtual environment can be the same as the actual environment, but one or more characteristics can be changed. For example, the actual environment can be processed to enhanced certain elements to render a virtual environment. Additionally, the actual environment can be modified to enhance the image quality to render a virtual environment. In some embodiments, one or more elements of the actual environment are altered in visual characteristics such as color, shape, size, light and etc.

In some embodiments, the virtual environment can be the same as the actual environment, but its relations with the real life object are altered. In some embodiments, the real life object becomes much smaller or much larger in scale relative to its environment, as in the movie Alice in Wonderland. For example, a person who is drinking tea in the captured images can be shown within a tea cup in the final integrated image while the other elements of the environment remain unchanged.

In some embodiments, a server can provide collections virtual environment to a user. The virtual environment can be divided into different categories based on the themes present therein. Exemplary themes include but are not limited to nature, animals, space, movie, architecture, culture, travel, and etc. A user's selection for particular types of themes can be stored in user preference.

In some embodiments, the virtual environment composes an image. In some embodiments, the virtual environment comprises a video. In some embodiments, multiple virtual environments can be included, each treated as a separate element during image or video integration.

At block 18, optional secondary signals are provided. Secondary signals can include internal or external data, including image, audio, video, text, spatial, geographical, or any other type of information. In some embodiments, secondary signals include non-visual signals such as audio signals, for example, sound information collected when capturing the image information of the real life object. In some embodiments, the audio signals include internal or existing audio signals or external audio signals. In some embodiments, internal or existing audio signals are obtained from the captured images or videos and subject to further processing (e.g., voice recognition and subsequent language translation). In some embodiments, audio signals of a video can be processed for enhanced sound effects. For example, ambient noises can be removed to enhance the voice of a real life object (e.g., a speaker during a conference call). In some embodiments, special sound effects can be added to a desirable voice. For example, a voice can be rendered to have a three-dimensional hollow effects to mimic sounds in an echoing environment.

In some embodiments, external audio signals can be added to existing audio signals. For example, a user can choose to play a background music during a video conference call. In some embodiments, external audio signals are used to replace existing audio signals (e.g., audio signals collected while capturing images of the real life object). Such audio signals (external or internal) can be associated with any elements in the system (e.g., block 12, 14, 16 and 20). In some embodiments, the audio signals are associated with virtual environment. In some embodiments, the audio signals can be added to integrated images. An exemplary process for implementing audio signals (e.g., as real-time translation) is depicted in FIG. 1C.

In some embodiments, secondary signals include one or more advertisement elements. The advertisement elements can be associated with a product or a service. In some embodiments, the advertisement elements include internal or existing audio signals or external audio signals. In some embodiments, the advertisement elements can be associated with the real life object (e.g., element 12 or 14). For example, the real life object can wear or hold a product comprising the advertisement elements. In some embodiments, the advertisement elements are added to virtual environment 16. For example, the advertisement elements can be displayed as part of the virtual environment. In some embodiments, the advertisement elements can be implemented integrated images or videos. For example, the advertisement elements can be treated as another virtual environment, in addition to the existing virtual environment, during integration. In some environments, the advertisement elements can be added post-integration; for example, at the time when a user views the integrated image or video.

In some embodiments, advertisement elements are provided based on user preferences that are stored either locally on a user device or on a server (e.g., as part of a user profile). In some embodiments, user preferences are determined by user shopping histories. In some embodiments, a user may specifically request a product, a service, a type of product, or a type of service. In some embodiments, general user information such as age and gender may be used as reference. In some embodiments, generally available trending information may be used.

Additionally and advantageously, advertisement elements are provided based on context information. Context information includes but is not limited to communication context, advertisement content context, presentation context and etc. For example, if advertisement is presented during a conference meeting at a company, advertisements may include content of products and services relating to the specific industry of the company. When an advertisement is to be presented as online ads embedded in a public forum such as a web site or web page, the content of the web site and/or web page can be taken into consideration. No advertisement will be provided if the content on such web site and/or web page is deemed inappropriate. Content that is inappropriate includes but is not limited to religious fanaticism, terrorism, pornography and etc. The criteria can be set by the server providing the advertisement content. In some embodiments, an advertiser may set criteria for content that it does not want to be associated with.

In some embodiments, when multiple advertisers can provide the same or similar suitable content, a bidding process may be implemented to select the advertisement content.

At block 20, the extracted real life object and the virtual environment are integrated or combined to render images or videos of a real life object within the virtual environment. To achieve integration, relations between the extracted real life object and the virtual environment will be defined. In some embodiments, the relations are defined concurrently as image extraction and/or virtual environment construction. In some embodiments, the relations are defined once image information of the real life object is extracted and the virtual environment is constructed.

In some embodiments, the system or user provides a general pre-defined guideline to the relations. In some embodiments, the relations are entirely defined automatically by the system based on information from the extracted real life object and the virtual environment. In some embodiments, a user can provide real-time adjustment to re-define or modify the relations between the extracted real life object and the virtual environment during the integration process.

In some embodiments, relations between the extracted real life object and the virtual environment include depth relation. For example, the extracted real life object can be partially or entirely "in front of" or "behind" an element of the virtual environment. In some embodiments, the extracted real life object can be partially or entirely "in front of" one element but partially or entirely "behind" another element of the same virtual environment. In some embodiments, the depth relations between all or a portion of the extracted real life object changes temporally with time progression between different images. In some embodiments, the depth relations between all or a portion of the extracted real life object changes spatially over different elements in the same image.

In some embodiments, relations between the extracted real life object and the virtual environment include a transparency relation. For example, the extracted real life object can be partially or entirely transparent relative to an element of the virtual environment. In some embodiments, the transparency relations between all or a portion of the extracted real life object changes temporally with time progression between different images. In some embodiments, the transparency relations between all or a portion of the extracted real life object changes spatially over different elements in the same image.

Image Integration Illustration

In some embodiments, the integration takes place in a pixel-by-pixel fashion. In some ways, the integration process can be best understood in a reversed manner starting from the integrated image. In some embodiments, each pixel within an integrated image can be divided into multiple layers such as a foreground layer, an intermediate layer and a background layer. Each layer is filled based on image information from respective corresponding pixels the extracted real life object and/or virtual environment.

Figure 1B:
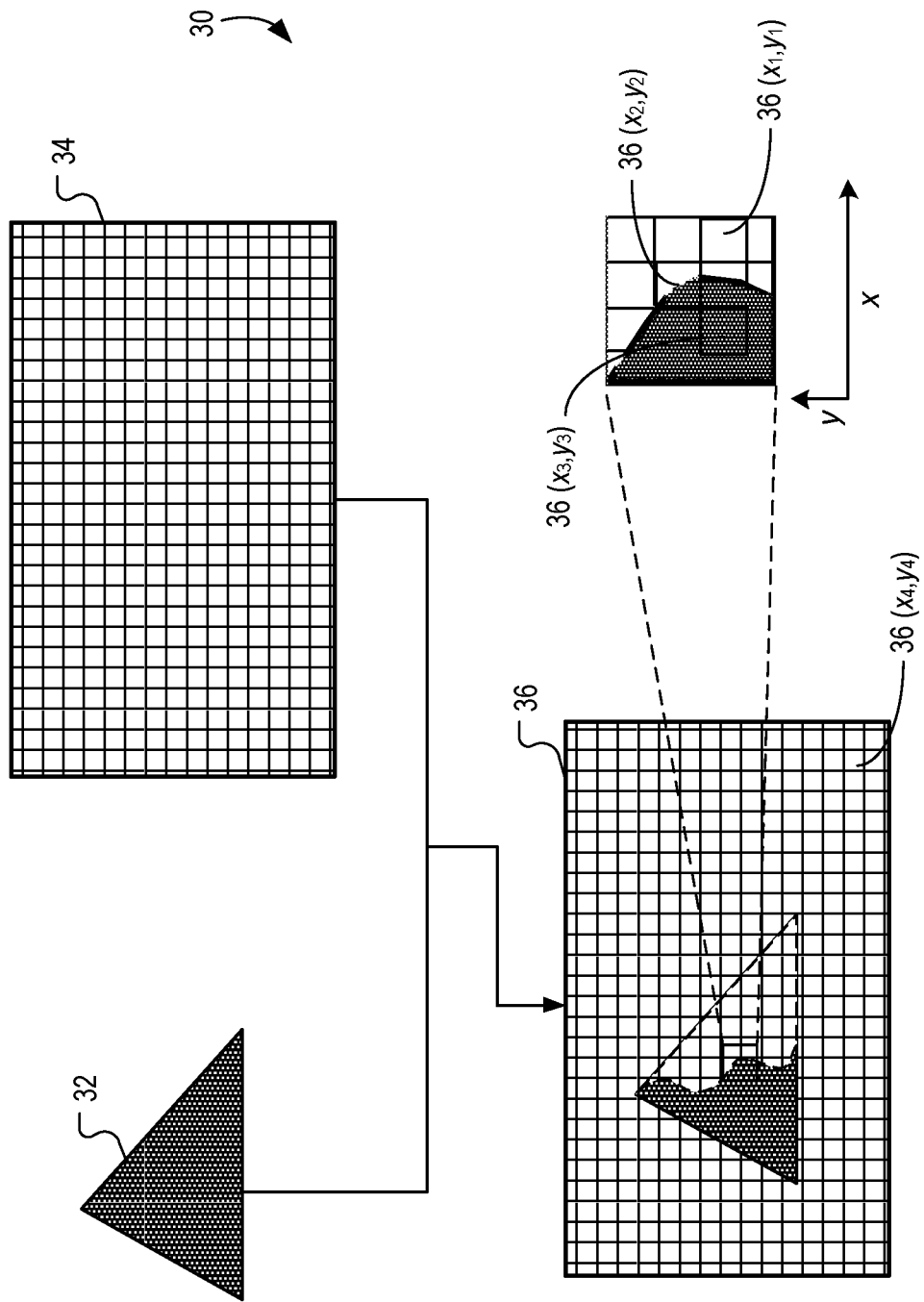
FIG. 1B depicts an example process for real-time image and signals processing.
Figure 1C:
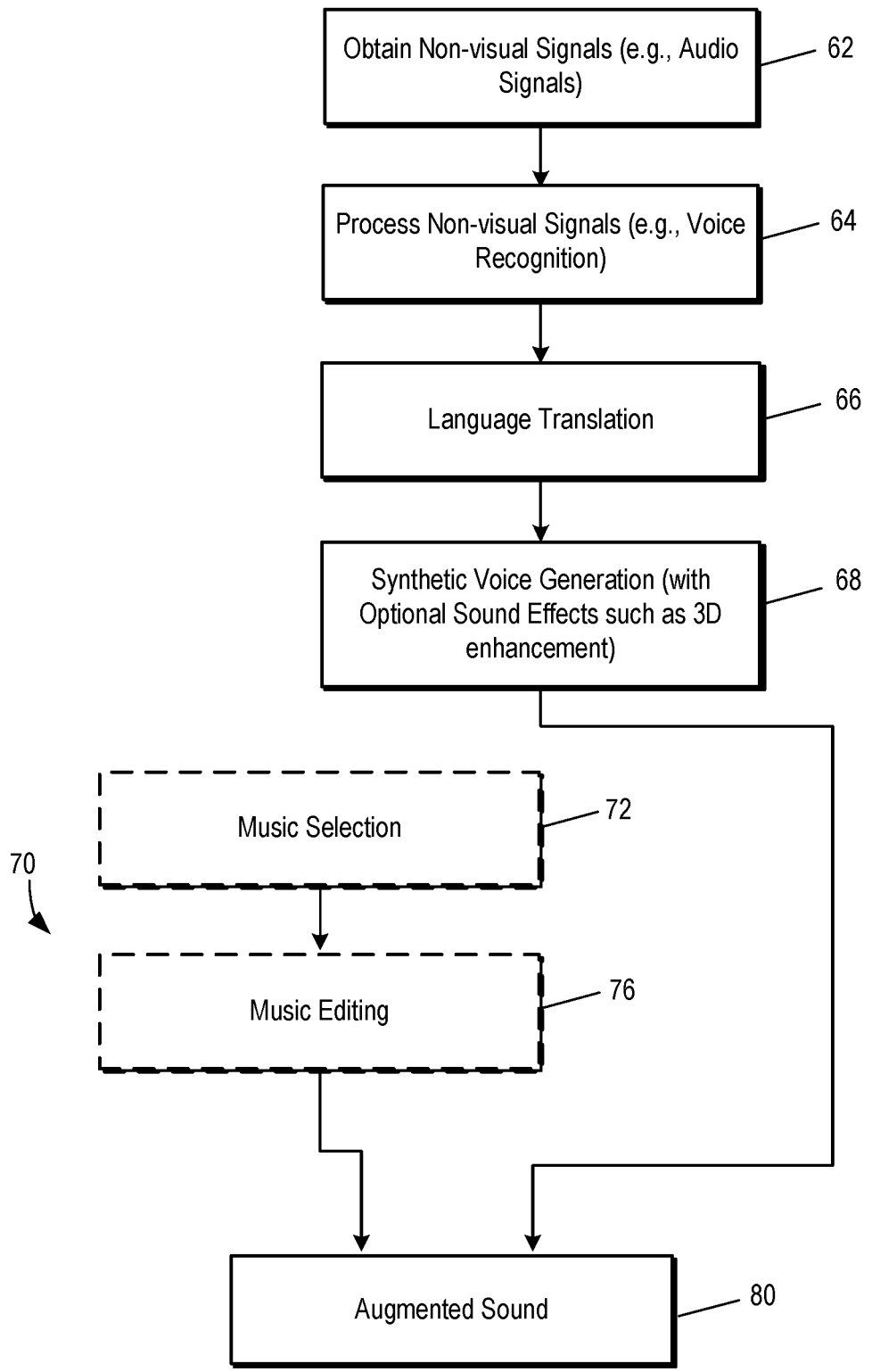
FIG. 1C depicts an example process for providing secondary data.

FIG. 1B provides an illustration of an exemplary embodiment of pixel-by-pixel integration process 30. Here a simplified extracted real life object 32 is represented by a triangle. A simplified virtual environment is shown as 34, a rectangle with grid patterned, where each grid represents a pixel. An image obtained by integrating real life object 32 with virtual environment 34 is illustrated as integrated image 36. As depicted, certain pixels of real life object 32 become invisible (being positioned behind virtual environment 34); see, for example, pixel 36 ($x_1$, $y_1$). Some pixels of real life object 32 are partially visible and partially invisible (being positioned partially in front of and partially behind virtual environment 34); see, for example, pixel 36 ($x_2$, $y_2$). Some pixels of real life object 32 are completely visible (being positioned in front of virtual environment 34); see, for example, pixel 36 ($x_3$, $y_3$). Some of the pixels in integrated image 36 complete lack any information from real life object 32; see, for example, pixel 36 ($x_4$, $y_4$).

Using the three layered approach, pixel 36 ($x_1$, $y_1$) has a front layer that is defined by a pixel in virtual environment 34 and either its intermediate layer or background layer can be filled with information from a corresponding pixel from real life object 32. However, because the transparency value of the front layer is set at 0, whatever behind the front layer is completely blocked by the pixel in virtual environment 34. As such, alternatively, pixel 36 ($x_1$, $y_1$) can be obtained by defining its front layer with the pixel information from virtual environment 34 while setting values of the intermediate layer or background layer to null.

Pixel 36 ($x_2$, $y_2$) depicts information from both real life object 32 and virtual environment 34. This pixel can be obtained by defining the front layer with partial information from real life object 32, the intermediate layer with information from a corresponding pixel from virtual environment 34, and the background layer with partial information from real life object 32. Again, the transparency level for each layer is set at 0 so the intermediate layer is partially shown and the background layer is completely blocked. When the transparency levels for different layers are set at none-zero value, information from real life object 32 and virtual environment 34 will blend with each other throughout the pixel.

Pixel 36 ($x_3$, $y_3$) is the opposite of pixel 36 ($x_1$, $y_1$). It has a front layer that is defined by a pixel in real life object 32 and either its intermediate layer or background layer can be filled with information from a corresponding pixel from virtual environment 34. However, because the transparency value of the front layer is set at 0, whatever behind the front layer is completely blocked by the pixel in real life object 32. As such, alternatively, pixel 36 ($x_3$, $y_3$) can be obtained by defining its front layer with the pixel information from real life object 32 while setting values of the intermediate layer or background layer to null.

Pixel 36 ($x_4$, $y_4$) is located in an area where real life object 32 and virtual environment 34 do not overlap. In this case, real life object 32 is completely missing. It can be obtained by defining any of the three layers with the information from the corresponding pixel from virtual environment 34 while setting the value for the remaining levels to null.

In some embodiments, as illustrated above, parallel computing can be carried out for multiple pixels at the same time. In some embodiments, computing can be simplified by identifying pixels in non-overlapping regions. In some embodiments, computing can also be simplified by defining only the top layer for solid pixels that are completely non-transparent.

In some embodiments, the extracted real life object comprises three-dimensional image information that can be divided between one or more of the front, intermediate and background layers in any combinations. In some embodiments, the virtual environment comprises three-dimensional image information that can be divided between one or more of the front, intermediate and background layers in any combinations.

In some embodiments, the relations between an extracted real life object (e.g., 32) and a virtual environment (e.g., 34) changes dynamically. In some embodiments, such dynamic changes take place over time between integrated images. For example, real life object 32 may move in and out of virtual environment 34. In some embodiments, at least a portion of the real life object interacts with one or more elements of the virtual environment. For example, this can occur in a game setting where a real life object (a user) can use gesture to bounce balls off a wall in the virtual environment or pass a ball to a player in the virtual environment.

It is to be noted that functionalities associated with the blocks in FIGS. 1A and 1B can take place on the same computer device or on different computer devices. When the functionalities are performed by different computer devices, any combinations of devices can be used. It should be noted that, in any of the combinations, image capture is always performed by the computer device that is accessible to the user or real life object.

Processing Secondary Signals

FIG. 1C illustrates a process for processing secondary signals such as non-visual signals. Process 60 shows an example for obtaining non-visual signals from captured video data. All steps performed here can be implemented through signal processing module 128 depicted in FIG. 1D.

At step 62, the video capture by a user device is processed to extract audio information, which includes but is not limited to, for example, ambient sound, the voice or noise of a real life object, and any other audio information.

At step 64, the non-visual signals are further processed. For example, ambient sound and other noises can be reduced or eliminated to enhance the voice or noise of a real life object. The enhanced audio signals can then be subject to specialty programs such as a voice recognition program to detect the language and recognize the content of the audio signals.

At step 66, during a conference call, if one speaks in a language that is not understood by one or more who are also present at the conference call, the language can be automatically translated into a language the other attendees would understand. In some embodiments, subtitle can be provided on the display to enhance understanding.

At step 68, synthetic voice generating methods can be used to create an audio translation of the audio signals obtained at step 62. In some embodiments, a user can choose to set a preference for a certain type of voice and accent. In some embodiments, the audio translation file can be optionally enhanced for additional sound effects such as three-dimensional echoing sound effect.

In some embodiments, as illustrated by process 70, external audio signals can be added. Here external audio signals are those that are not part of the captured video file. For example, at step 72 a user can select his or her preferred music as background music for a video created using the method disclosed herein. In some embodiments, a user may select a preferred piece of music as background sound during a conference call.

At step 76, the selected piece of audio can be edited or processed to better fit an intended purpose. For example, only a segment of a music piece may be selected as audio soundtrack for a video. Additionally, a selected piece music can be tuned down before it can be used as background audio for a video conference call. The examples provided herein refer to a two participant conferencing system. However, the method and system disclosed herein can be applied to more than two participants, including three or more, five or more, ten or more, twenty or more, fifty or more, or hundreds or more, so long as the conferencing system can support the number of participants.

At step 80, external audio signals and internal audio signal are combined to create augmented sound.

Exemplary System

As illustrated above in the exemplary embodiment in FIG. 1B, information flow can be divided into three blocks: extracted real life object 32, virtual environment 34 and integrated image 36. Functionalities associated with these different information blocks can be performed by one or more computer devices in any combinations (e.g., data processed at one device can be transferred to another device for further or additional processing).

Figure 1D:
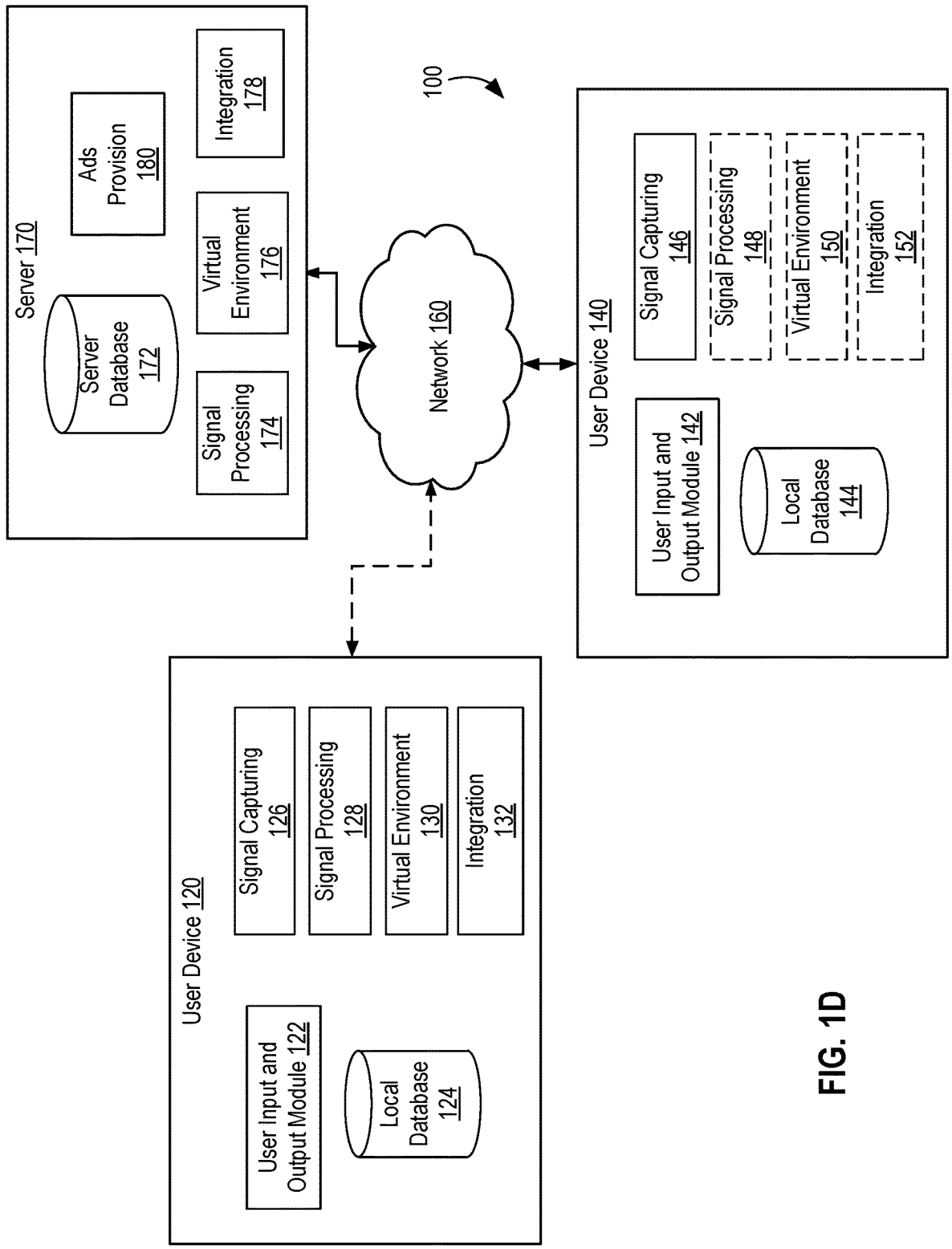
FIG. 1D depicts an example system for real-time image and signals processing.

FIG. 1D illustrates an exemplary system 100 for carrying out the functionalities disclosed herein. Here multiple user devices (e.g., 120 and 140) are connected to a server device 170 via network 160. Information processing takes place on one or more of the devices illustrated.

User device 120 depicts a local device (e.g., a device that is accessible to a real life object) equipped with multiple functionalities. In particular, user device 120 comprises a user input and output (1/O) module 122, a local database 124, and all functional modules (e.g., modules 126, 128, 130 and 132) for capturing images of a real life object, extracting the real life object, constructing a virtual environment and integrating extracted the real life object with virtual environment.

In some embodiments, user device 120 includes a user input and output module (1/O module) 122. For example, 1/O module 122 can receive user input to user device 120 and present output from user device 102, using text, audio, video, motion, and/or haptic output mechanisms. For example, 1/O module 122 can receive a gesture input, a body movement, or a voice input from a user. In some embodiments, 1/O module 122 is also configured to detect and track eye movement, facial expression and etc. Also for example, 1/O module 122 receive touch input from a touch sensitive display of user device 120. In other embodiments, 1/O module 122 can be coupled to other input devices, such as a keyboard, mouse, a monitor, touch sensitive screen, a speaker and etc., and receive user input from these devices. In some embodiments, 1/O module 122 includes a keyboard, mouse, a monitor, touch sensitive screen, a speaker and etc. as an integral part of /0 module 122 or user device 120. In some embodiments, user device 120 can receive multiple types of user input.

In some embodiments, 1/0 module 122 can also present audio, visual, motion, and/or haptic output to the user. For example, 1/O module 122 display integrated images or videos on a monitor a user of device 120. In some embodiments, 1/O module 122 can present GU is that enable or support the functionality of one or more of the real-time image and signal processing methods/systems described herein, including but not limited to signal capturing module 126, signal processing module 128, virtual environment module 130 and integration module 132. In some embodiments, the user input and output module includes a plurality of menu commands, each corresponding to the functionality of one or more of the query processing modules.

In some embodiments, 1/O module 122 allows a user to locate information that is needed for image processing. In embodiments, menu options can be provided such that a user can select one or more options to initiate one or more functions. For example, a user can click an icon to start image capturing process. Also for example, multiple categories of virtual environment images can be provided via menu options.

In some embodiments, a user may use 1/O module 122 to request information that is available either on the local user device 120 or can be obtained via network connection from service device 170 or another user device 140. For example, 1/O module 122 can allow a user to use voice command to request a certain type of virtual environment (e.g., European medieval castle images). Once the images are delivered (either locally or via network connection), a user can request that the images be processed to construct a virtual environment.

In some embodiments, a user may use 1/O module 122 to manage various functional modules. For example, a user can request via use 1/O module 122 to change the virtual environment while a real-time communication is in process. A user can do so by select a menu option or type in a command discretely without interrupting the communication.

When methods/systems disclosed herein are used for image or video processing and editing, a user can use any type of input to direct and control the process.

In some embodiments, user device 120 further comprises a local database 124. For example, local database can store captured images, partially or fully processed images (e.g., extracted real life object and images for virtual environment), or partially or fully integrated images. In some embodiments, local database 124 stores user specific information; for example, a user can store information of one or more preferred virtual environment. In some embodiments, local database 124 stores information retrieved from another device or a server. In some embodiments, local database 124 stores information retrieved from internet searches.

In some embodiments, local database 124 sends data to and receives data from one or more of the functional modules, including but not limited to signal capturing module 126, signal processing module 128, virtual environment module 130, and integration module 132.

In some embodiments, user device 120 comprises signal capturing module 126. For example, signal capturing module 126 can include an image capturing device such as a camera. In some embodiments, the camera is depth enabled. In some embodiments, two or more cameras are used. In some embodiments, a built-in or an external microphone can be used for audio collection. In some embodiments, signal capturing module 126 captures multiple images. In some embodiments, signal capturing module 126 captures a video continuously.

As disclosed herein, signal capturing module 126 captures images of a real life object in the actual environment where the real life object is physically located. In some embodiments, the real life object is a user of user device 120. In some embodiments, the user is not the real life object, but controls user device 120 to capture images of an object that is accessible to signal capturing module 126. For example, the real life object can be a celebrity who is being photographed by a user operating signal capturing module 126.

The methods and systems disclosed herein are advantageous because they do not require a real life object to be in a specific type of environment to aid image processing.

In some embodiments, user device 120 comprises an signal processing module 128. For example, signal processing module 128 extracts a real life object from images captured by module 126 by separating image information of the real life object from its actual environment. The extraction utilizes a comprehensive characteristic-based mechanism, including artificial intelligence based mechanisms. The comprehensive characteristic-based mechanism recognizes one or more differences in a particular characteristic between the real life object and the actual environment. For example, a characteristic can include and is not limited to a visual characteristic of the real life object or the actual environment captured in the video clip, a real-time learned characteristic of the real life object or the actual environment, or a pre-learned feature relating to the real life object or the actual environment. In some embodiments, a visual characteristic can include but is not limited to comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof. In some embodiments, the spatial characteristic composes a three-dimensional spatial characteristic.

In some embodiments, a real-time learned characteristic includes but is not limited to color, shape, edge, light reflectance, light illuminance, exposure, brightness, shadow, highlight, contrast, blackpoint, motion, depth, material, or combinations thereof. In some embodiments, a pre-learned feature also includes but is not limited to color, shape, edge, light reflectance, light illuminance, exposure, brightness, shadow, highlight, contrast, blackpoint, motion, depth, material or combinations thereof.

An extraction process as disclosed herein can be completed in one round or in multiple rounds. In some embodiments, signal processing module 128 performs a round of rough extraction first before carrying out one or more additional rounds of fine extraction. For example, rough extraction can trace an outline for the real life object while fine extraction can refine the edges separating the real life object and its actual environment. In some embodiments, one or more rounds of fine extraction can also identify a region within the outline of the real life object that is in fact part of the environment and subsequently remove the region from the real life object.

In some embodiments, in addition to image extraction, signal processing module 128 can also evaluate and modify images.

In some embodiments, signal processing module can process non-visual signals such as audio signals, as illustrated in FIG. 1C.

In some embodiments, user device 120 comprises a virtual environment module 130.

Virtual environment module 130 can create and modify a virtual environment for subsequent image integration. For example, virtual environment module 130 can construct a virtual environment based on one or more images. A virtual environment can be two-dimensional or three-dimensional. A virtual environment can include features that are not present in the images on which the virtual environment is based. For example, virtual environment module 130 can alter or adjust one or more elements in the virtual environment by modifying the corresponding images. In some embodiments, such modifications or adjustments are made based on one or more features of the real life object such that the extracted real life object and virtual environment can be more effectively integrated. An exemplary modification or adjustment includes but is not limited to scaling, change of orientation, change of shape, change of color, image quality adjustment (e.g., exposure, brightness, shadow, highlight, contrast, or blackpoint), and etc. The modification or adjustment can be made locally on individual elements within the virtual environment or globally on the entire virtual environment. In some embodiments, an virtual environment can be different from the actual environment. In some embodiments, an virtual environment can be the same as the actual environment with one or more elements in the virtual environment being modification for subsequent image integration.

The functionalities of virtual environment module 130 and signal processing module 128 share many similarities and, in some embodiments, they may be combined.

In some embodiments, user device 120 comprises an integration module 130. Integration module 130 combines extracted real life object with the virtual environment to create integrated images. As illustrated in detail in connection with FIG. 1B, integration can occur on a pixel-by-pixel basis for both efficiency and accuracy.

In some embodiments, exemplary system 100 further comprises user device 140. In some embodiments, user device 140 can have the same functional modules as user device 120; e.g., user input and output module 142, local database 144, signal capturing module 146, signal processing module 148, virtual environment module 150 and integration module 152. When a functional module is present, it can be implemented similarly as in user device 140 or according to any applicable known technology.

In some embodiments, user device can have fewer functional modules and instead relies on a server 170 to provide one or more functionalities. As illustrated in FIG. 1D, other than signal capturing module 146, the other image integration related modules, including signal processing module 148, virtual environment module 150 and integration module 152, can be optional to user device 140. Effectively, these functionalities can be split between user device 140 and server 170 in any combination. For example, user device 140 can transmit captured images to server 170 for image processing (e.g., image extraction). In some embodiments, extracted real life object is integrated with a virtual environment on server 170. In some embodiments, extracted real life object can be transmitted back to user device to be integrated with a virtual environment. In some embodiments, a user can choose to provide a customized virtual environment. For example, user device can transmitting a selected virtual environment to server 170 before subsequent image integration takes place on server 170.

In some embodiments, a user can choose to turn on or off functionalities. For example, a user can elect to communicate with another in the actual environment where the user is physically located. For example, when communicating with a family member who is away, a user can choose to display the actual home environment without any alteration.

The user can do so by leaving on only signal capturing module 146 while turning off the other functional modules. Additionally, a user can choose to turn on any of the remaining functional module.

In some embodiments, exemplary system 100 further comprises a server 170, Server 170 communicates with one or more user devices and include functional modules such as server database 172, signal processing module 174, virtual environment module 176, integration module 178, advertisement provision module 180, or variations thereof. In some embodiments, signal processing module 174, virtual environment module 176 and integration module 178 are similar to those disclosed herein in connection with user device 120 or user device 140. In some embodiments, these modules may perform differently on server 170 due to the server's enhanced computing power and storage space in comparison to a user device. For example, integration can take place in parallel in a higher number of pixels than a user device would allow.

Advertisement provision module 180 determines whether advertisement content will be provided in connection with certain integrated images and/or videos. As disclosed in FIG. 1A, advertisement content is a type of secondary signals that can be incorporated into final integrated images and/or videos at various points along the integration process, for example during image extraction, construction of virtual environment or final integration. Additionally, advertisement elements can be added in real-time post integration at the time when the integrated images or videos are viewed.

Exemplary Embodiments

The systems and methods disclosed herein have many applications. For example, they can be used to create or modify images for presentation purposes; see for example, FIGS. 2 and 3A through 3C. Alternatively, they can be used to enable more effective real-time communication, as illustrated in FIGS. 4A through 4C and FIGS. 5A through 5C.

Figure 2:
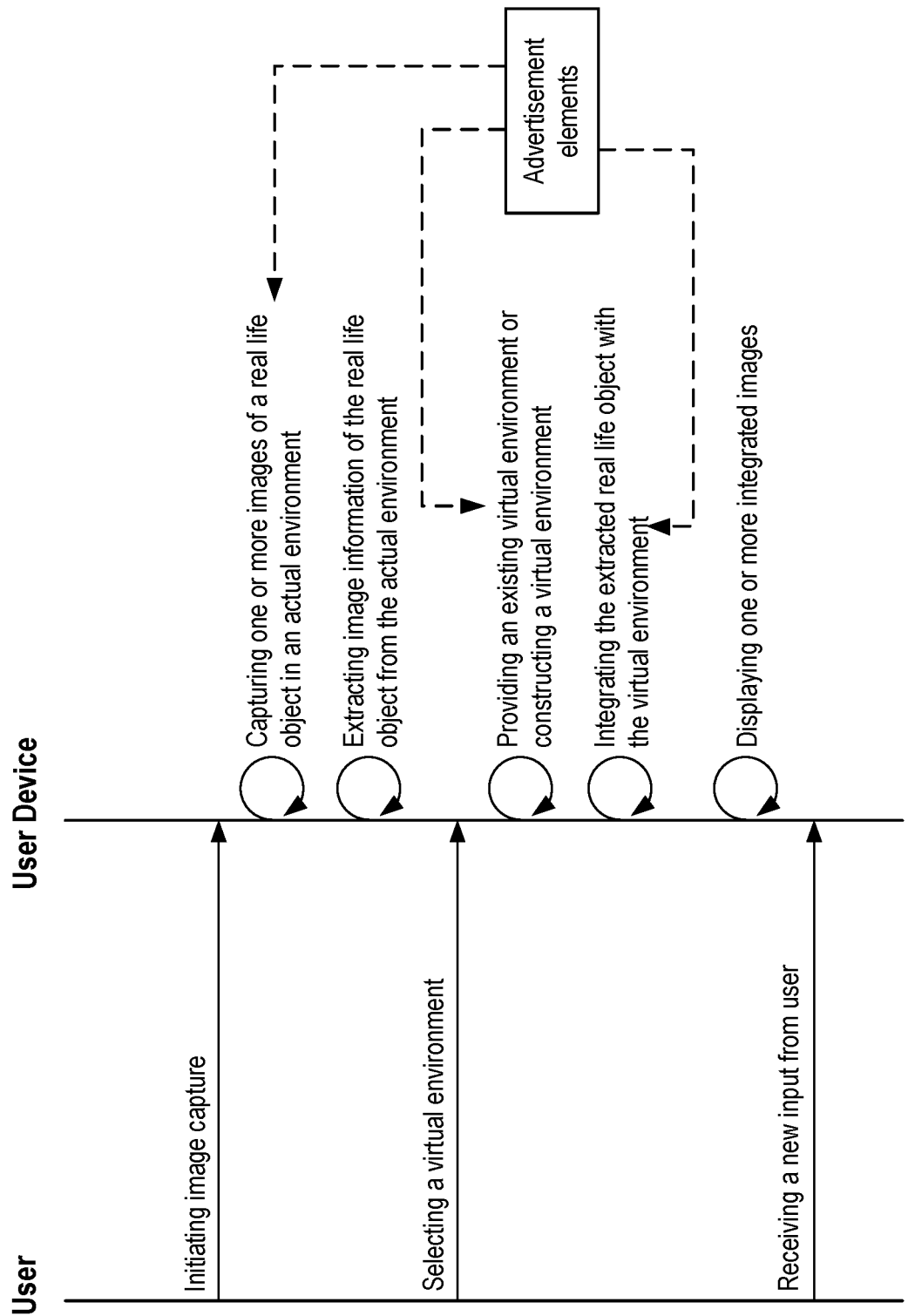
FIG. 2 depicts example steps and system for real-time image and signals processing on a user device.

FIG. 2 illustrates a sample process where all functionalities are performed on a user device. In some embodiments, this can be enabled by a device such as user device 120. Here, a user can initiate image capture by turning on a depth-enabled camera that is attached to the user device or an integral part of the user device. A real life object here can be the user of the device or an object that is accessible by the device. For example, a photographer or videographer can operate the user device to collection images and videos of a real life object (e.g., a person, an animal, or combinations thereof).

Extraction of real life object follows image capture, which can take place automatically and concurrently with image capture. In some embodiments, a user can manually control when image extraction should start. For example, for image or video editing, a user can select when and where image extraction should start so that only the desired images or video portion will be processed.

In some embodiments, a user can select a virtual environment. The selection can take place after image extraction or concurrently with image extraction. In some embodiments, an existing virtual environment is selected. In some embodiments, a virtual environment can be constructed ad hoc after the user selection. In some embodiments, one or more features of the real life object can be considered when constructing the virtual environment. For example, when a real life object is intended to interact with elements of a virtual environment, the size or shape of the virtual environment may be adjusted for seamless integration.

Integration of the extracted real life object and the virtual environment can also take place automatically once data of extracted real life object and virtual environment become available. In some embodiments, a user can manually control when image integration should start. For example, also for image or video editing, a user can select when and where image integration should start so that only the desired images or video portion will be processed.

Figure 5A:
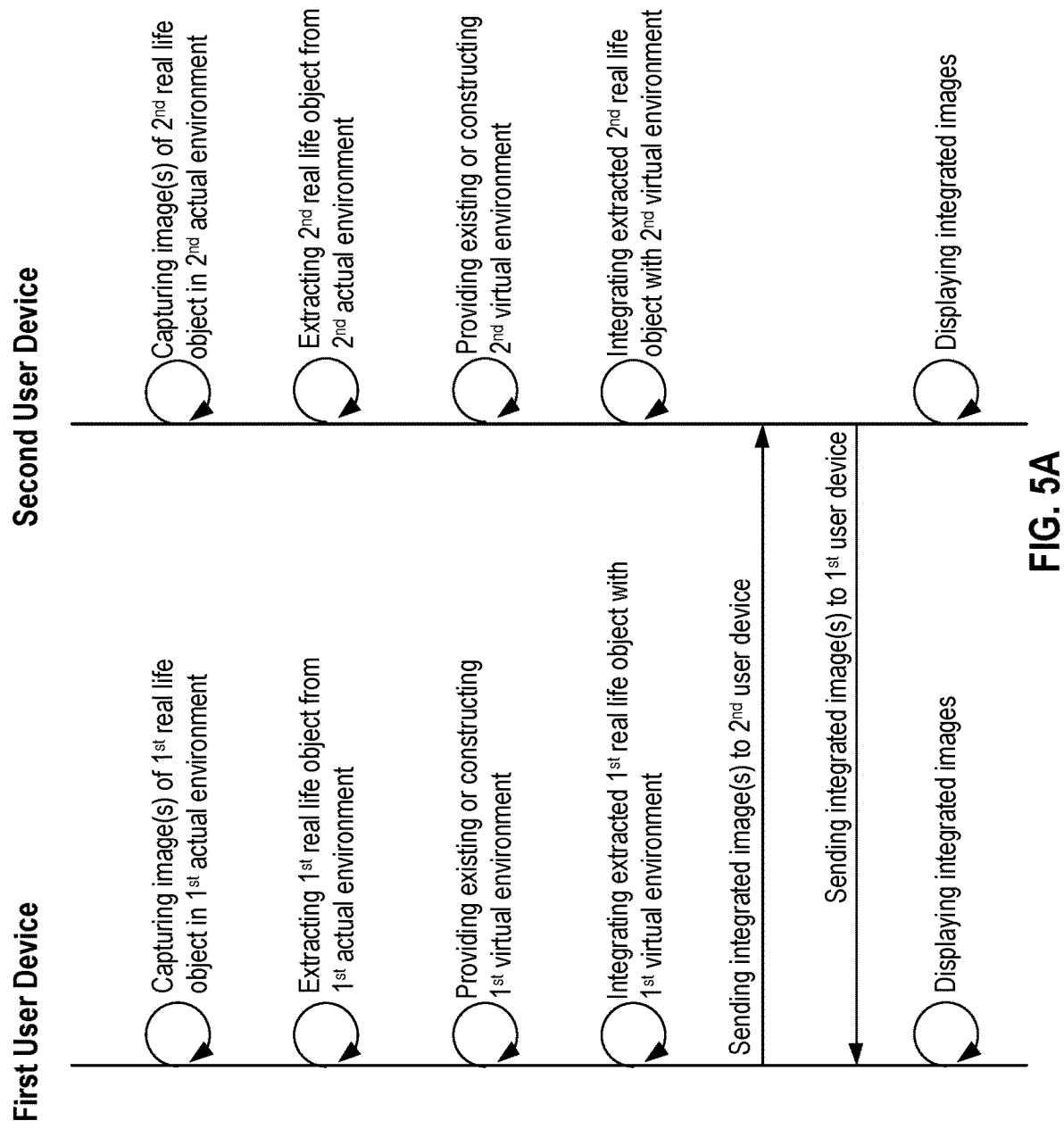
FIG. 5A depicts example steps and system for real-time image and signals processing between two user devices.
Figure 5B:
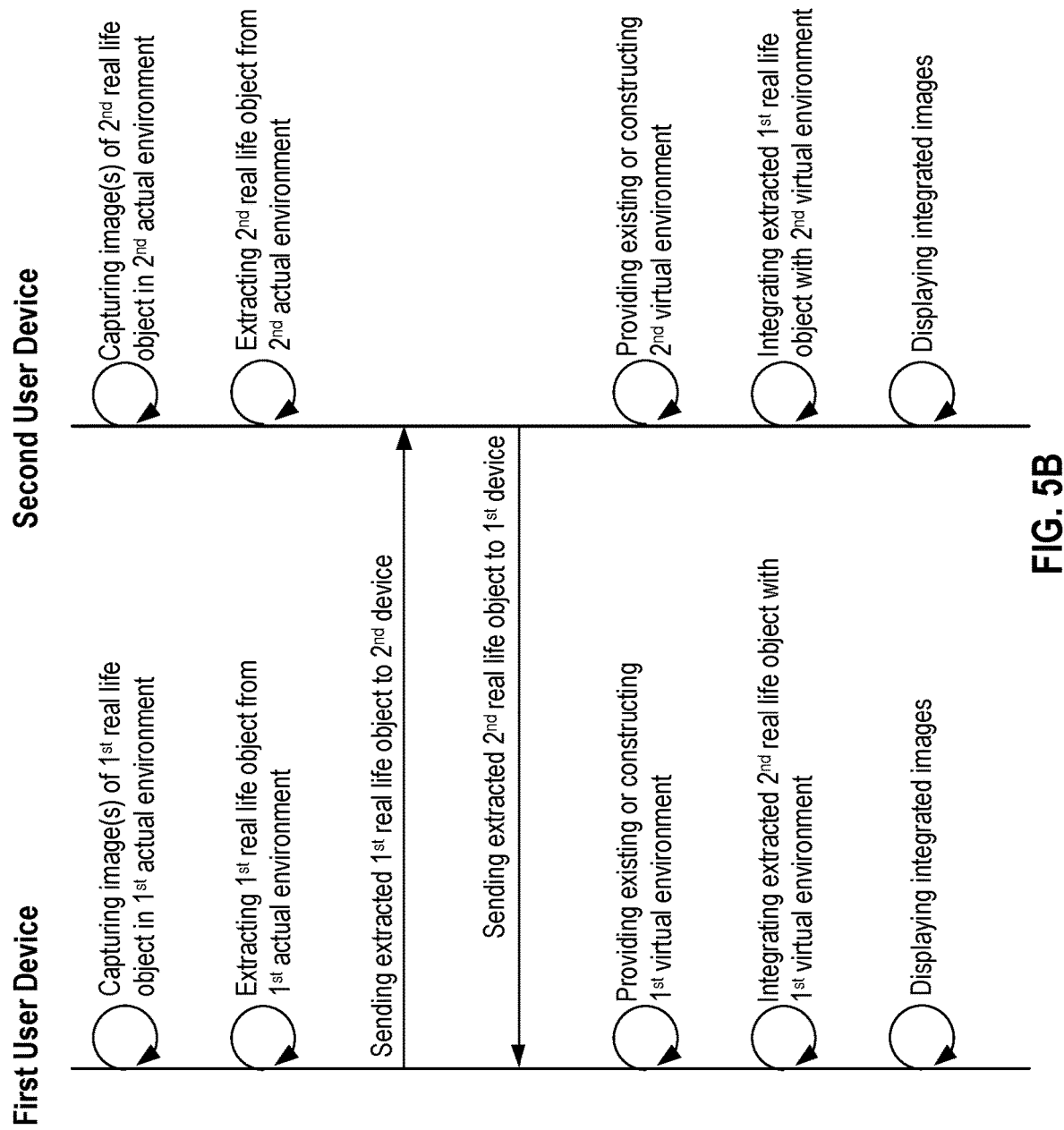
FIG. 5B depicts example steps and system for real-time image and signals processing between two user devices.
Figure 5C:
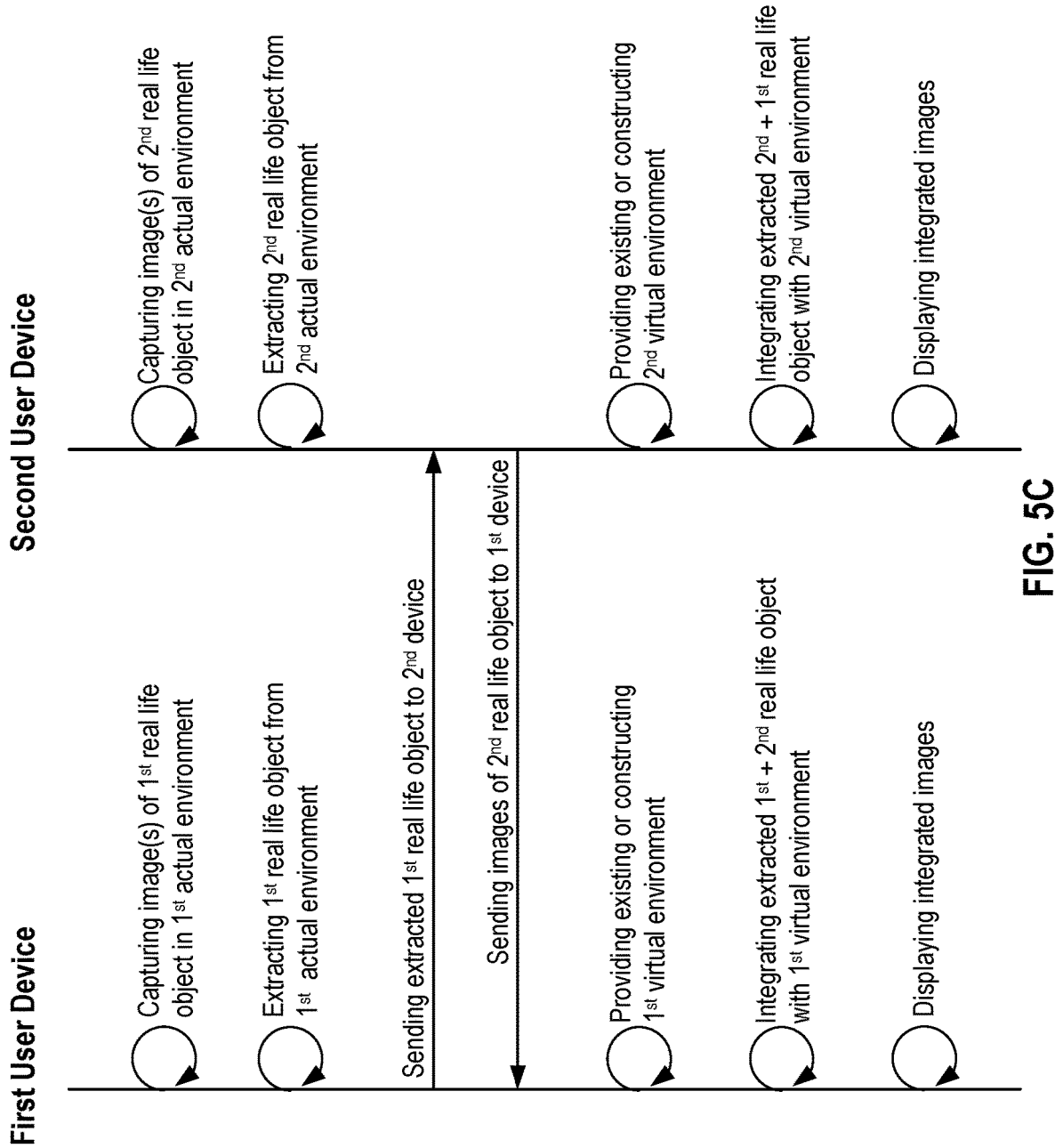
FIG. 5C depicts example steps and system for real-time image and signals processing between two user devices.

As depicted, advertisement material can be added in one or more the steps on the user device. In some embodiments, the user device may send advertisement elements to or received advertisement elements from another user device, for example, in a multi-device communication system as depicted in FIGS. 5A through 5C.

Figure 3A:
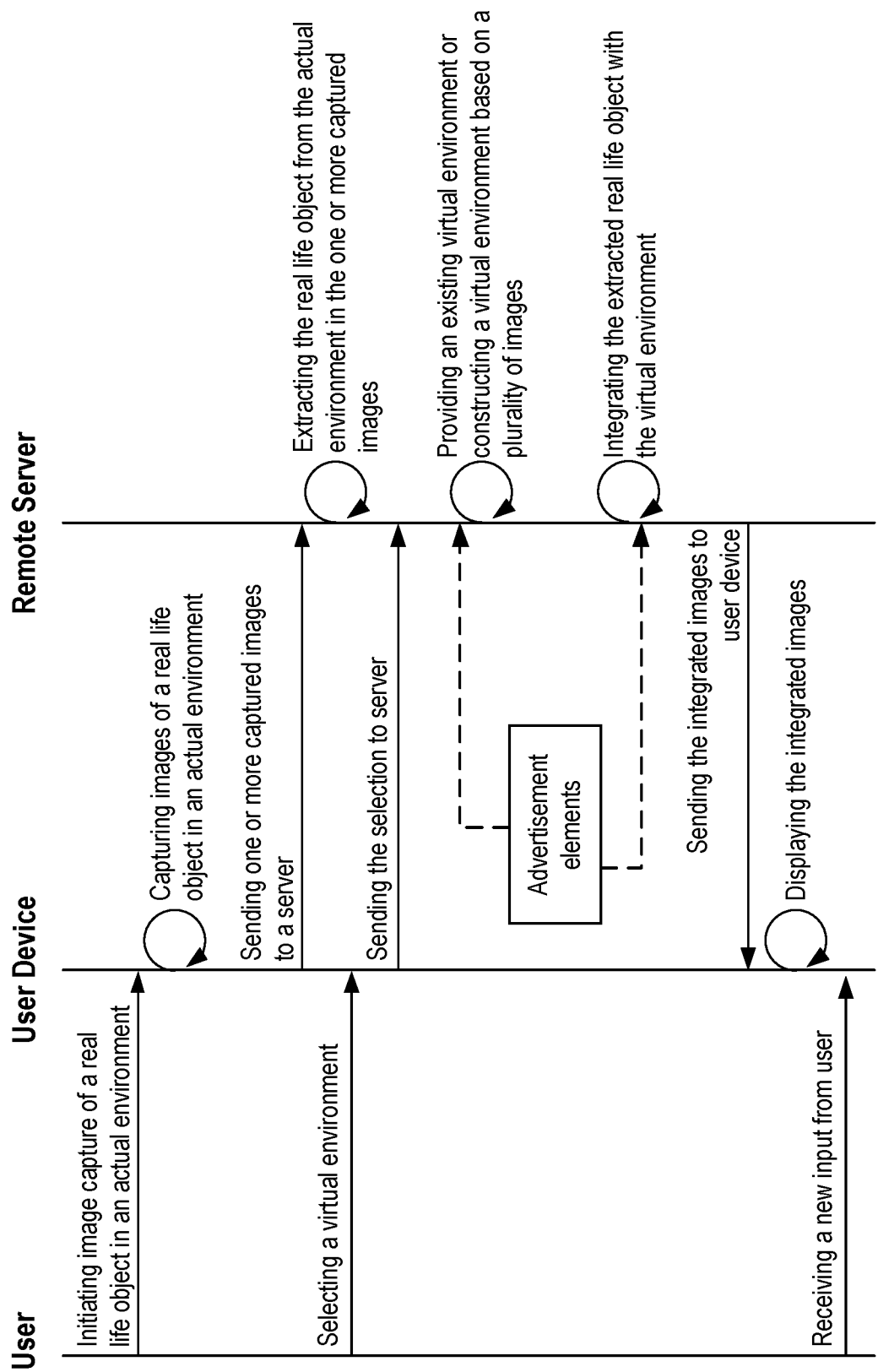
FIG. 3A depicts example steps and system for real-time image and signals processing between a user device and a server.
Figure 3B:
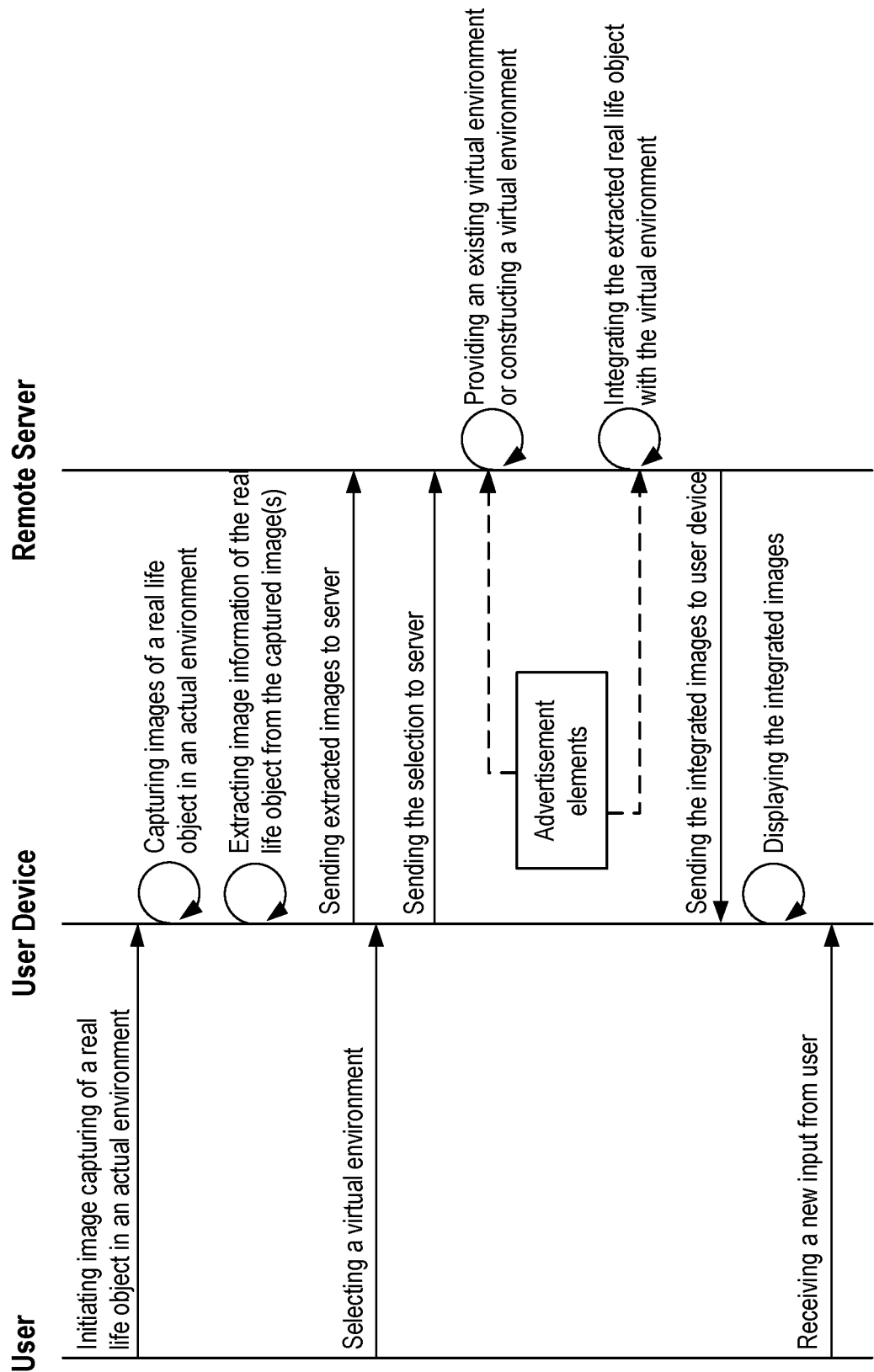
FIG. 3B depicts example steps and system for real-time image and signals processing between a user device and a server.
Figure 3C:
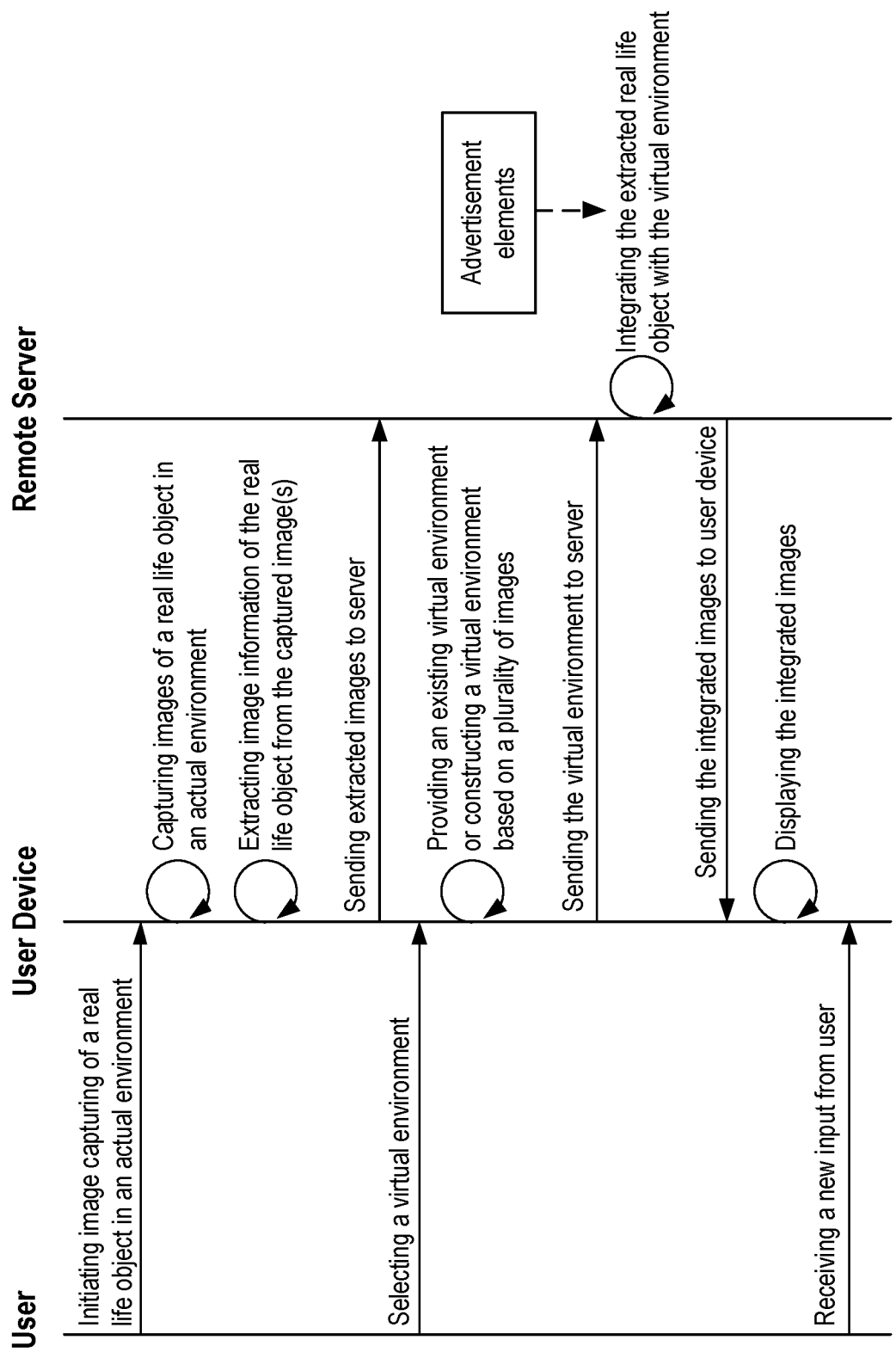
FIG. 3C depicts example steps and system for real-time image and signals processing between a user device and a server.

FIGS. 3A through 3C illustrate sample embodiments where functionalities are split between a user device and a remote server. As shown in FIG. 3A, except image capturing, which takes place on a user device, other processing steps including image extraction, provision or construction of virtual device, and integration of the two are all performed on the remote server. The integrated images are then transmitted back to user device for viewing. A user can choose to modify the integrated images by providing user input after viewing the integrated images.

In FIG. 3B, besides the image capturing step, the image extraction step also takes place on the user device. Provision or construction of virtual device, and integration of the two are both performed on the remote server. The integrated images are then transmitted back to user device for viewing.

In FIG. 3B, besides the image capturing step, image extraction and provision and construction of virtual environment also takes place on the user device. Only integration is performed on the remote server. The integrated images are then transmitted back to user device for viewing.

The processes illustrated in FIGS. 2 and 3A through 3C can be used for non-communication purposes, such as image and/or video editing, for creating real-time or non-real-time/deferred presentation materials including but not limited to personal videos, documentaries, news materials, educational materials, or advertisement material. Such processes can be interactive, a user can change or modify a command or selection at various points, including but not limited to the time when image capturing is initiated and the time when a virtual environment is selected. For example, a virtual education video about ancient Rome can be created ahead of time or in real-time. When a teacher shows the video in class, she may ask a student to participate as a guide. Using a system as disclosed herein, a student can appear in the video as a virtual guide to ancient Rome.

A user can use the embodiment depicted in FIG. 2 to independently create images or videos without assistance from an external server. The images or videos can be for personal enjoyment or as a form of speech (e.g., including for advertisement). As disclosed herein, advertisement elements can be added in any one or multiple method steps.

For example, a real estate agent can create flyers by inserting a real-time image of himself into photos of a piece of property using existing photos of the property without having to retake photos. Additionally, the method here allows existing photos of the property to be enhanced by real-time modification when generating the integrated image.

As another example, a user can create small budget advertisement on a local user device, with or without assistance from a server. For example, an owner of a flower shop, can incorporate images of their specialty flower arrangement into her favorite scenes in a video clip.

A user can also use the embodiments depicted in FIGS. 3A through 3C to create images or videos with assistance from one or more external servers. The images or videos can be for personal enjoyment or as a form of speech (e.g., including for advertisement). As disclosed herein, advertisement elements can be added in any one or multiple method steps that are performed on the server.

The processes illustrated in FIGS. 2 and 3A through 3C can also apply to real-time communication. For example, the integrated images will be transmitted to another user device, either directly or indirectly via a server. Here, the choice of a virtual environment can be made by the user device transmitting the integrated images. The user device receiving the integrated images will see the virtual environment of the sending device's choosing. In some embodiments, the recipient user device can choose to turn off the virtual environment selected by the sending user device.

In some embodiments, one or more advertisement elements can be added during a communication process. The content of the advertisement elements can be determined based on a number of factors such user preference or context information. In some embodiments, the selected advertisement elements can be incorporated into the virtual environment. For example, when a traveler to San Francisco on business contacts his family, the virtual environment he selected may include advertisement for local gift shops. When he makes business conference call, however, the virtual environment he selected may include advertisements that are relevant to the operation of his company or industry. In these examples, the advertisement content is determined by the communication context.

FIGS. 4 and 5 provide further illustration of sample embodiments for real-time communication, where integration images are transmitted from one user device to another user device via network collection, via an intermediate service or directly.

Figure 4A:
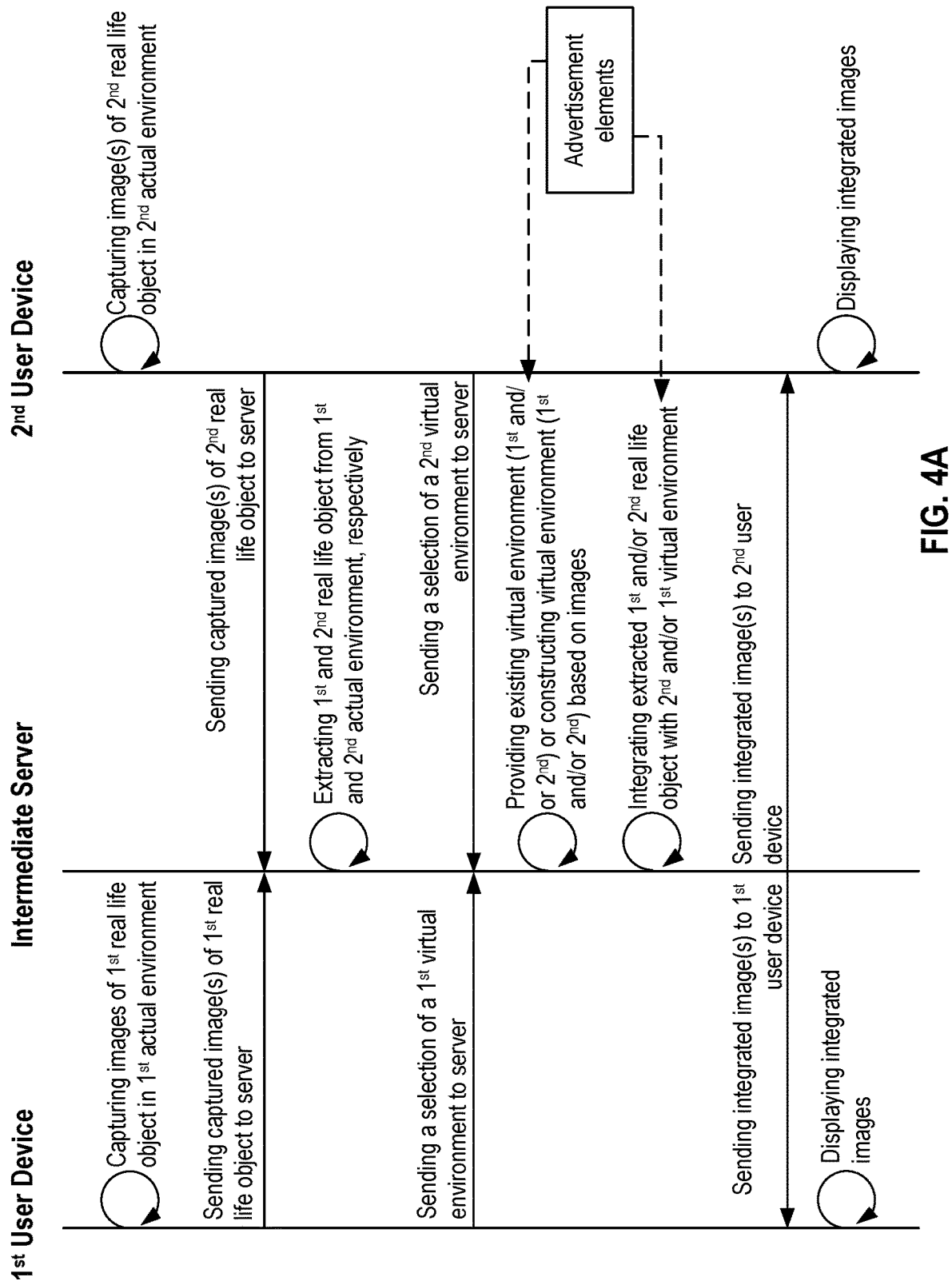
FIG. 4A depicts example steps and system for real-time image and signals processing between two user devices and an intermediate server.

FIG. 4A illustrates a sample embodiment where two user devices communicate with each other via an intermediate server. Other than image capturing, which takes place on a user device, other processing steps including image extraction, provision or construction of virtual device, and integration of the two are all performed on an intermediate server. Here, both the first user device and second user device send captured images of the respective real life object to the intermediate server, which then extracts the first and second real life objects from their respective actual environment.

The first user device sends a selection of a first environment to the server and the second user device sends a selection of a second environment to the server. In some embodiments, the server provides the selected virtual environments from a library of virtual environments stored in a database on the server. In some embodiments, the server constructs the respective virtual environments based on images provided by the user devices or selected from a database on the server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

Figure 4B:
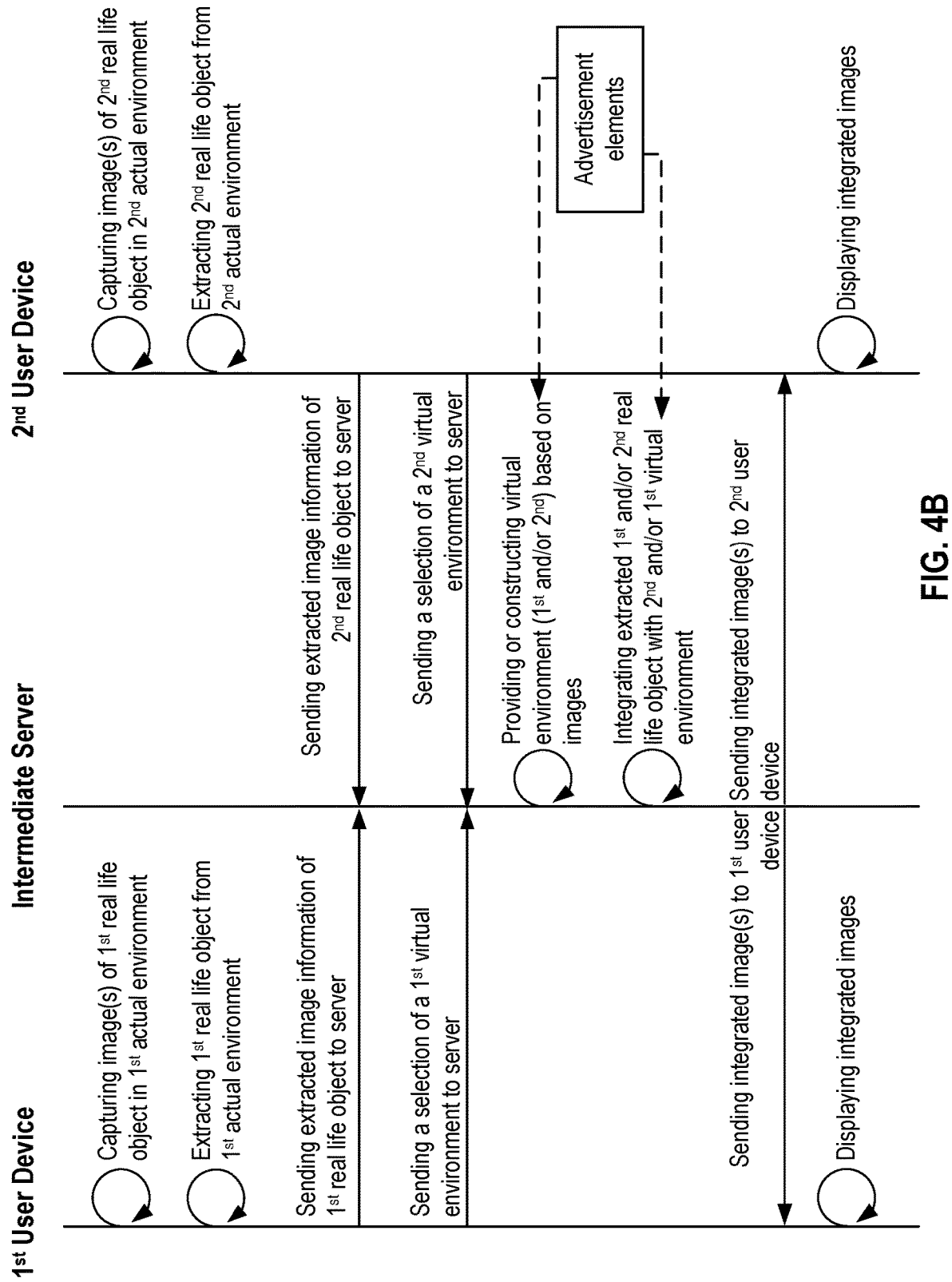
FIG. 4B depicts example steps and system for real-time image and signals processing between two user devices and an intermediate server.

FIG. 4B illustrates a sample process similar to that of FIG. 4A except that image extraction takes place on the user devices instead of on the intermediate server. The extracted images are then transmitted to the intermediate server. Virtual environments are still provided or constructed by the intermediate server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

Figure 4C:
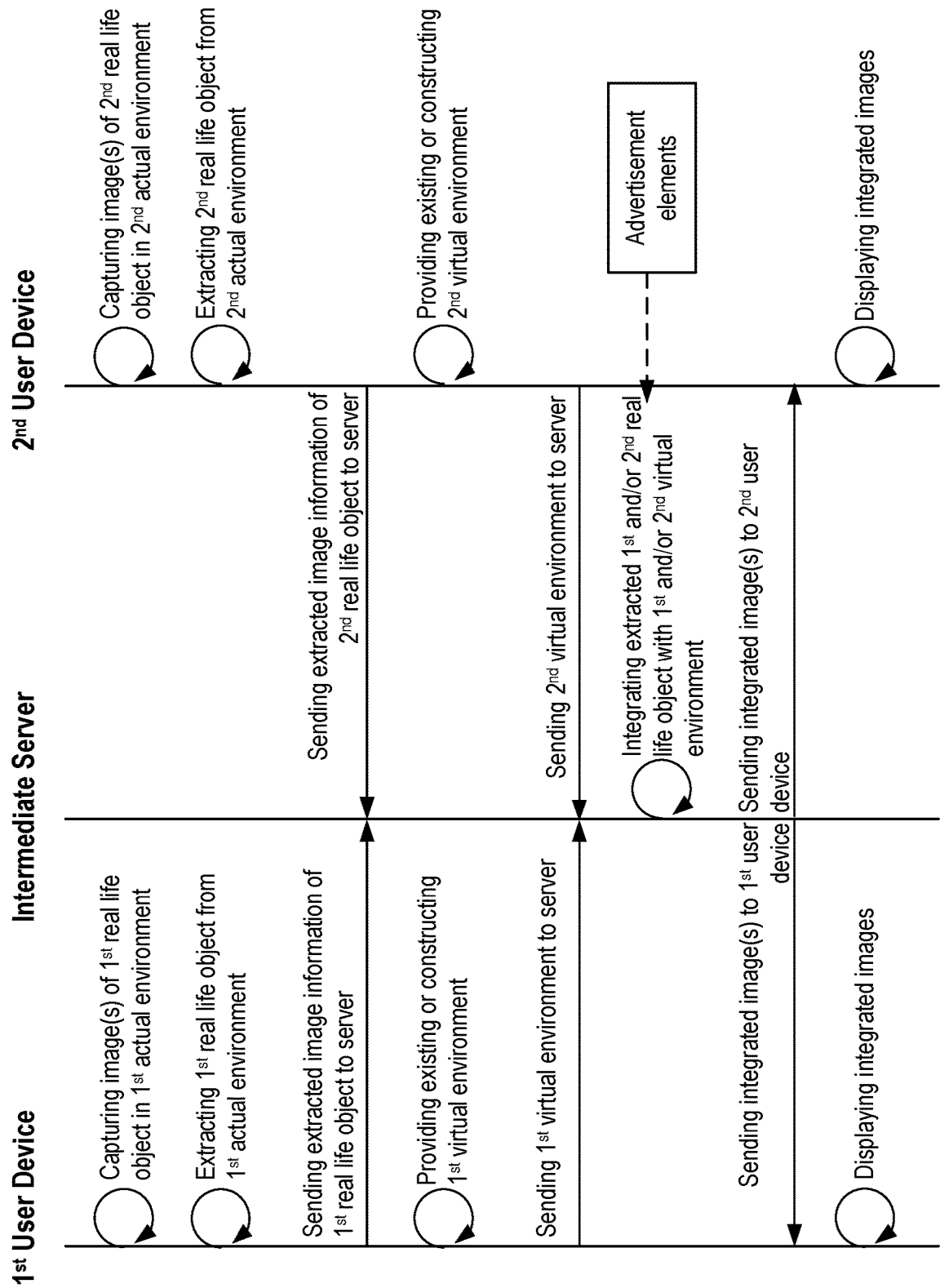
FIG. 4C depicts example steps and system for real-time image and signals processing between two user devices and an intermediate server.

FIG. 4C illustrates a sample process similar to those of FIGS. 4a and 4B. Here, an additional processing step takes place on the user devices. For example, in addition to image capture, image extraction and provision and construction of the virtual environment also take place on the user devices. The extracted images and virtual environment are then transmitted to the intermediate server. During integration, the extracted first real life object will be integrated with a virtual environment chosen by the second user device. Similarly, the extracted second real life object will be integrated with a virtual environment chosen by the first user device. Although it is possible to integrate an extracted real life object with the virtual environment of its own choosing, depicted in FIG. 4A is the preferred embodiment because images of the first real life object will be viewed at the second user device.

The sample embodiments depicted in FIGS. 4A to 4C allow a server to provide advertisement content while engaging the users in other activities such as video conferencing. In some embodiments, one or more advertisement elements can be added during a communication process. The content of the advertisement elements can be determined based on a number of factors such as user preferences or context information.

In the embodiments shown in FIGS. 4A to 4C, the users do not actively seek advertisements so it is important that the advertisements be provided in a non-intrusive and yet relevant fashion, based on user preference and context information. In some embodiments, the selected advertisement elements can be incorporated into the virtual environment. For example, when a person travels to San Francisco on business contacts his family, the virtual environment he selected may include advertisement for local gift shops. In addition, advertisements may be presented to his family as well during the conference call and the content can be selected, for example, based on the geolocation of his family.

When he makes business conference call, however, the virtual environment he selected may include advertisements that are relevant to the operation of his company or industry. Again, advertisements may be presented to the other callers as well during the conference call and the content can be selected, for example, based on the geolocation of their locations, and the operation of their companies or industries. In some embodiments, the same advertisement is presented. In some embodiments, different advertisements are presented to different participants. In these examples, the advertisement content is determined by the communication context.

FIGS. 5A to 5C illustrate sample embodiments where user devices directly communicate with each other without an intermediate server.

In FIG. 5A, each user device in two user devices captures images, extracts image, provides/constructs a virtual environment and integrates the extracted real life object with the virtual environment. The integrated images are transmitted, e.g., via Bluetooth™ or wireless connection to the other user device for display. Again, this may not be a preferred environment because a user at one user device will be forced to view a virtual environment selected by the other device.

FIG. 5B illustrates an example embodiment where a user at one device can view integrated images in a virtual environment of its own choosing. For example, a first user device captures image of a first real life object in a first actual environment. The first real life object is then extracted and send to the second user device, which is then integrated into a second virtual environment selected at the second user device. Similarly, a second user device captures image of a second real life object in a first actual environment. The second real life object is then extracted and send to the first user device, which is then integrated into a first virtual environment selected at the second user device. In such embodiments, respective users can view the party they are communicating in their preferred virtual environment.

FIG. 5C illustrates an example embodiment where a user at one device can view integrated images in a virtual environment of its own choosing. For example, a first user device captures image of a first real life object in a first actual environment. The first real life object is then extracted and send to the second user device, which is then integrated into a second virtual environment selected at the second user device. Similarly, a second user device captures image of a second real life object in a first actual environment. The second real life object is then extracted and send to the first user device, which is then integrated into a first virtual environment selected at the second user device. In such embodiments, respective users can view the party they are communicating in their preferred virtual environment.

Although not depicted in FIGS. 5A through 5C, it will be understood that either user can choose to implement advertisement elements at one or more of the processing steps. In some embodiments, the exemplary processes shown in FIGS. 5A to 5C can be applied to jointly or collaboratively create presentation content, including but not limited to advertisement content.

The processes illustrated in FIGS. 4 and 5 can be used for real-time communication purposes. Such communications include but are not limited to video conferences, interactive gamming, interactive news materials, interactive educational materials, or interactive advertisement material. For example, a virtual education video about ancient Rome can be created ahead of time or in real-time. When a teacher shows the video in class, she may ask a student to participate as guide. Using a system as disclosed herein, a student can appear in the video as a virtual guide to ancient Rome.

Although the examples provided m FIGS. 4 and 5 both refer to a two party communication system, it by no means limit the scope of the invention to such. The methods and systems disclosed herein can work with any number of participants so long as such communication mode is supported.

The systems and methods illustrated in FIGS. 1-5 described hereinabove offer numerous advantages, in particular in connection with real-time image and signal processing for AR-based image and video editing and AR-based real-time communications. For example, the systems and methods disclosed herein allow accuracy, efficiency, convenience, and flexibility, and can be implemented in numerous applications.

The method and system disclosed herein further fuse music and environmental sound that fit for scenes in the integrated images/videos. Additionally, proper translated language voice is used to further augment the sound and experience. Over all, method and system disclosed herein would provide very immersive visual and audio experience to the users so that they feel like being in the same environment even though they are physically far away from one another.

The following outlines a number of examples where the method and system can be implemented. The method and system can be used for AR-based video conferencing. The method and system help to protect user privacy and allow a user to choose a preferable environment to view other participants of the conference.

The method and system can be used for AR-based video conferencing with embedded marketing applications. A user or enterprise can insert marketing messages, advertisements into the AR-based video conferencing, which provides exposure to products or services to users participating in the video conference.

The method and system can also be used for AR-based video recording and editing. A user can create videos of themselves being in any conceivable environment in the universe. It makes the green-screen video photographing obsoleted. This allows the user to do time travel; e.g., visiting Rome in its most glorious days. This can be done for educational purposes or just for fun.

The method and system create a seamless and immersive environment, allowing people to meet virtually as if they were in the same place while being physically located across vast geographic distances.

The method and system allows users who speaks different language to communicate freely with each other.

It will be understood that a user can use any applicable methods and/or systems to enhance the experience with material production and presentation, as well as active and passive advertisement experience. For example, such methods and systems include those disclosed in U.S. application Ser. No. 15/367,124 filed on Dec. 1, 2016 and entitled "methods and systems for personalized, interactive and intelligent searches, which is hereby incorporated by reference in its entirety.

Example System Architecture

Figure 6:
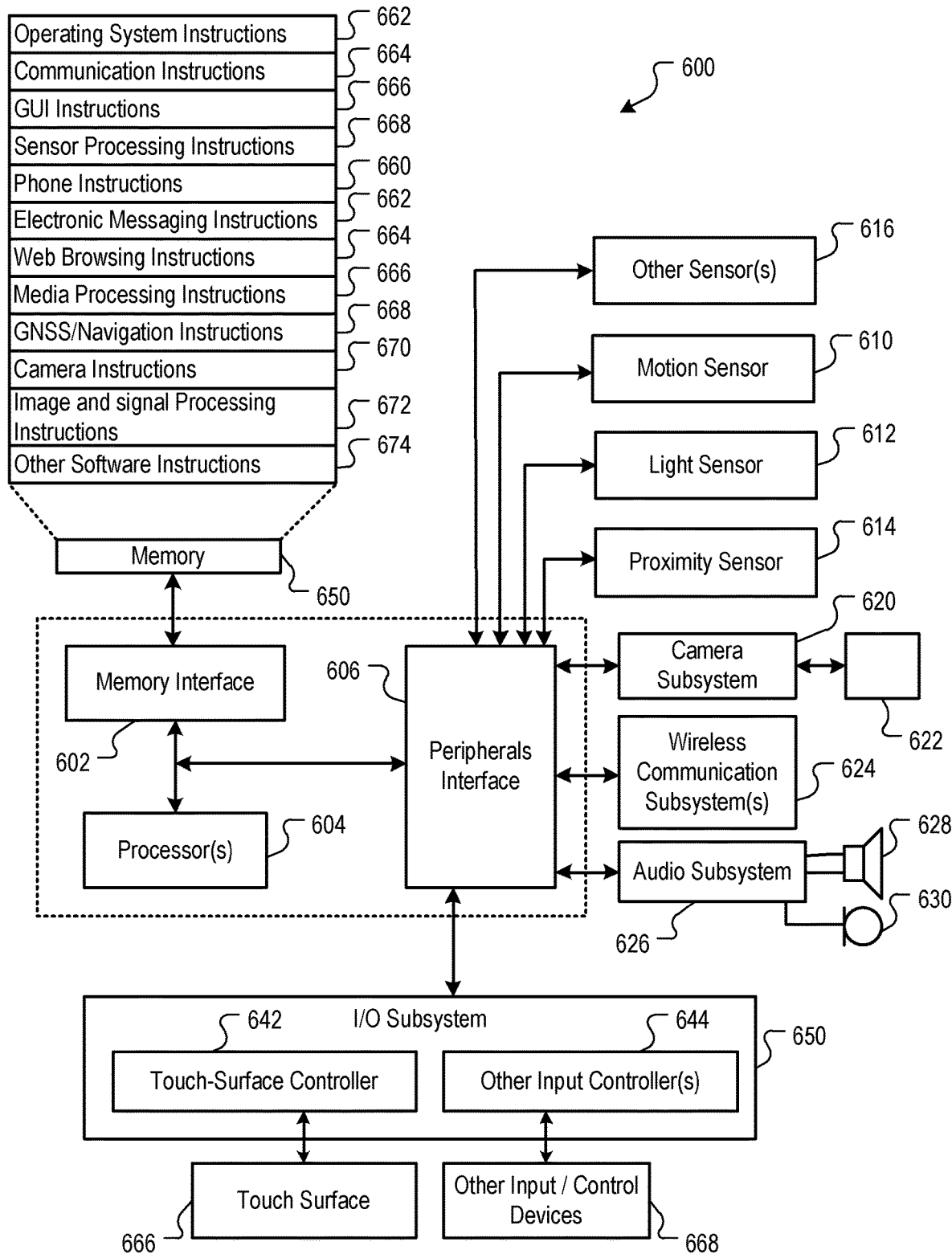
FIG. 6 depicts a block diagram of an example system architecture for implementing the features and processes of FIGS. 1-5.

FIG. 6 is a block diagram of an example computing device 600 that can implement the features and processes of FIGS. 1-6. The computing device 600 can include a memory interface 602, one or more data processors, image processors and/or central processing units 604, and a peripherals interface 606. The memory interface 602, the one or more processors 604 and/or the peripherals interface 506 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), an accelerometer, a gyro sensor, a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis. For example, camera subsystem 620 includes but is not limited to 2D camera, 3D camera, combination of 2D/3D camera, Infrared camera, near infrared camera, ultra violet camera, multiple spectrum camera, hyperspectral camera, and combination of multiple cameras.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network, and etc. In particular, the wireless communication subsystems 624 can include hosting protocols such that the device 120 can be configured as a base station for other wireless devices. Exemplary wireless system 624 includes but is not limited to wireless internet (WLAN, wifi, etc.), wired internet, Bluetooth, 2G/3G/4G/5G wireless, etc.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voice printing and voice authentication, for example. An audio subsystem 626 includes but is not limited to regular microphone, HD microphone, stereo microphone, and combination of multiple microphones.

The 1/0 subsystem 640 can include a display/touch-surface controller 642 and/or other input controller(s) 644. The display controller 642 can be coupled to a display device 646 such as touch surface. The display/touch surface device 646 and associated display controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with display/touch surface 646. They can be AR glass display, or regular display (mobile phone display, TV display, etc.)

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the display device 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The display device 646 can, for example, also be used to implement virtual or soft buttons and/or a keyboard.

[00181] A user can provide real-time feedback via one or more components of 1/0 subsystem 640, other input controllers 644 or any other types of input-output modules.

In some implementations, the computing device 600 can present recorded audio and/or video files, such as MP3, AAC, and MPEG files. In some implementations, the computing device 500 can include a smartphone, a tablet device, a laptop computer, or a wearable device (e.g., smart watch, smart glasses, etc.), a gaming system, an AR-based device, and/or an MR-based system. Exemplary AR devices include AR glass goggles (e.g., Mircosoft Hololens, Epson® Moverio glasses, etc.), and AR headset (e.g., Oakley airwave, etc.). Exemplary MR system includes Microsoft Kinect in combination with an Xbox and a display; Intel realsense camera in combination with a computer, and etc. Exemplary smart-phone based AR systems can include virtually any smart phones that are equipped with a camera/mic and other sensors.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing voice authentication. For example, operating system 652 can implement the image processing features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store image and signal processing instructions 672 to facilitate other processes and functions, such as the image processing processes and functions as described with reference to FIGS. 1-6.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

Figure 7:
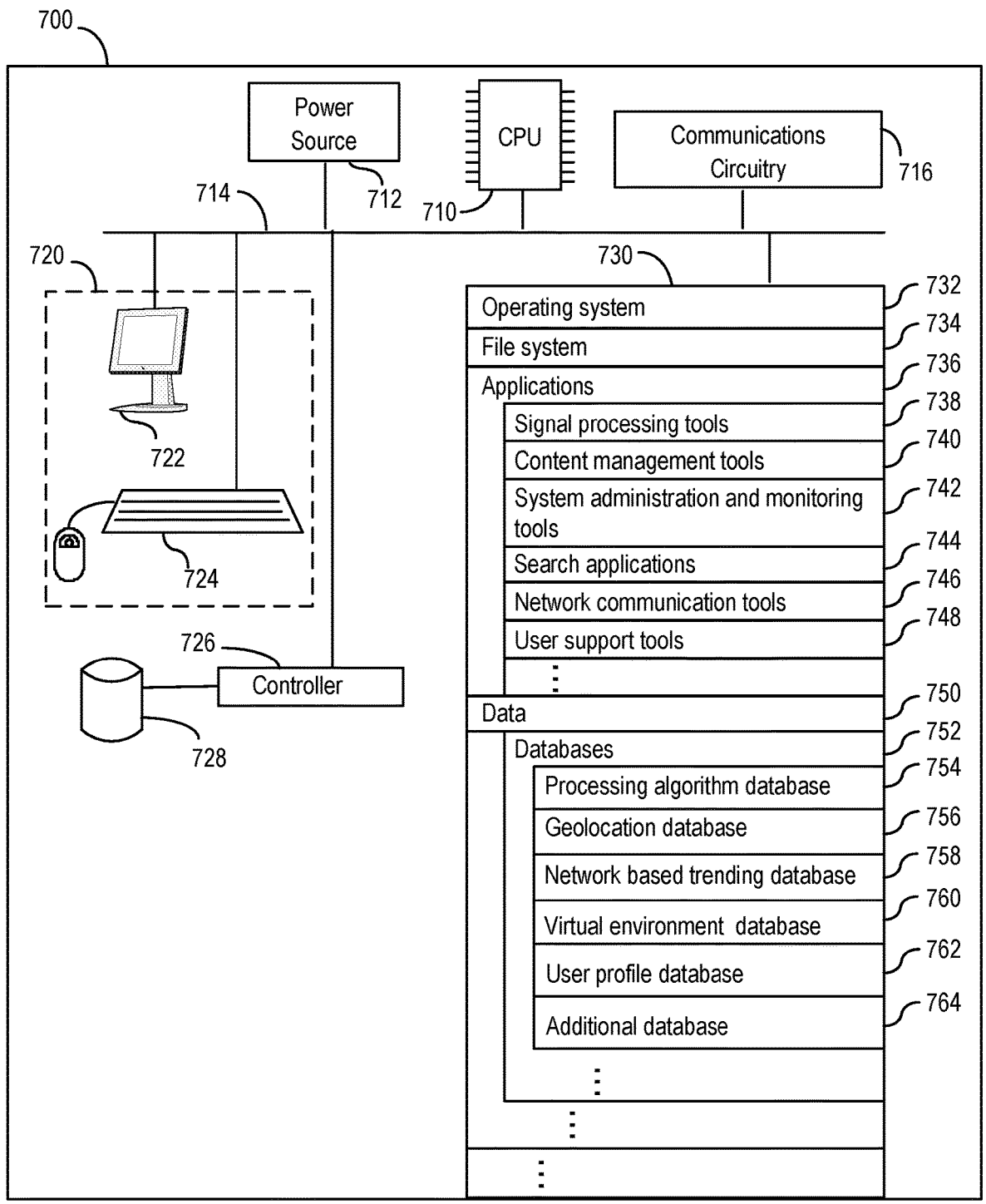
FIG. 7 depicts a block diagram of an example system architecture implementing for the features and processes of FIGS. 1-5.

FIG. 7 depicts a block diagram of an example remote server system architecture implementing for the features and processes of FIGS. 1-5.

In some embodiments, remote data server 700 may comprise a central processing unit 710, a power source 712, a user interface 720, communications circuitry 716, a bus 714, a controller 726, an optional non-volatile storage 728, and at least one memory 730.

Memory 730 may comprise volatile and non-volatile storage units, for example random-access memory (RAM), read-only memory (ROM), flash memory and the like. In preferred embodiments, memory 730 comprises high-speed RAM for storing system control programs, data, and application programs, e.g., programs and data loaded from non-volatile storage 728. It will be appreciated that at any given time, all or a portion of any of the modules or data structures in memory 730 can, in fact, be stored in memory 728.

User interface 720 may comprise one or more input devices 724, e.g., keyboard, key pad, mouse, scroll wheel, and the like, and a display 722 or other output device. A network interface card or other communication circuitry 716 may provide for connection to any wired or wireless communications network, which may include the Internet and/or any other wide area network, and in particular embodiments comprises a telephone network such as a mobile telephone network. Internal bus 714 provides for interconnection of the aforementioned elements of centralized data server 700.

In some embodiments, operation of centralized data server 700 is controlled primarily by operating system 732, which is executed by central processing unit 710. Operating system 732 can be stored in system memory 730. In addition to operating system 732, a typical implementation system memory 730 may include a file system 734 for controlling access to the various files and data structures used by the present invention, one or more application modules 736, and one or more databases or data modules 750.

In some embodiments in accordance with the present invention, applications modules 736 may comprise one or more of the following modules described below and illustrated in FIG. 7.

Signal Processing Application 738. In some embodiments in accordance with the present invention, a signal processing application 738 receives and processes signals transmitted to the server from user devices, including but not limited images, audio, or video.

By applying computation techniques (e.g., hash functions), signal processing application 738 turns input data, sensor data, network derived data into digital data to construct one or more databases 752 (e.g., 754-774).

Content Management Tools 740. In some embodiments, content management tools 640 are used to organize different forms of databases 752 into multiple databases, e.g., a processing mechanism database 754, a geolocation database 756, a network based trending database 758, a virtual environment database 760, a user profile and authentication database 762 and additional database 764 such as advertisement content. In some embodiments in accordance with the present invention, content management tools 740 are used to search and compare any of the databases hosted on the remote data server 700. Contents in accordance with the invention may be a text message, a URL, a web link, a note message, a post message, sensor data, a file, an image, an audio file, a video file, a flash file, a media file, a slideshow file, or any printable or visualizable file.

The databases stored on remote data server 700 comprise any form of data storage system including, but not limited to, a flat file, a relational database (SQL), and an on-line analytical processing (OLAP) database (MDX and/or variants thereof). In some specific embodiments, the databases are hierarchical OLAP cubes. In some embodiments, the databases each have a star schema that is not stored as a cube but has dimension tables that define hierarchy. Still further, in some embodiments, the databases have hierarchy that is not explicitly broken out in the underlying database or database schema (e.g., dimension tables are not hierarchically arranged). In some embodiments, the databases in fact are not hosted on remote data server 700 but are in fact accessed by centralized data server through a secure network interface. In such embodiments, security measures such as encryption is taken to secure the sensitive information stored in such databases.

System Administration and Monitoring Tools 742. In some embodiments in accordance with the present invention, system administration and monitoring tools 742 administer and monitor all applications and data files of remote data server. Because personalized data such as biometrics are stored on remote data server 700, it is important that access those files that are strictly controlled and monitored. System administration and monitoring tools 742 determine which user devices have access to remote data server 700 based on strict user authentication. In some embodiments, multiple rounds of authentication may be needed. In some embodiments, system administration and monitoring tools 742 use more than one security measure to protect the data stored on remote data server 700. In some embodiments, a random rotational security system may be applied to safeguard the data stored on remote data server 700.

Network Application 746. In some embodiments, network applications 746 connect a remote data server 700 through multiple network services. A remote data server 600 is connected to multiple types of user devices, which requires that remote data server be adapted to communications based on different types of network interfaces, for example, router based computer network interface, switch based phone like network interface, and cell tower based cell phone wireless network interface, for example, an 802.11 network or a Bluetooth network.

Customer Support Tools 748. Customer support tools 748 assist users with information or questions regarding their accounts, technical support, privacy or feedback on advertisement experience, etc. In some embodiments, a user may request (e.g., through real-time voice, text or gesture commands) to turn on and off the advertisement experience.

In some embodiments, each of the data structures stored on remote data server 700 is a single data structure. In other embodiments, any or all such data structures may comprise a plurality of data structures (e.g., databases, files, and archives) that may or may not all be stored on remote data server 700. The one or more data modules 750 may include any number of databases 752 organized into different structures (or other forms of data structures) by content management tools 740:

In addition to the above-identified modules, data 750 may also be stored on remote data server 700. Exemplary databases 752 include processing mechanism database 754, context database 756, advertiser database 758, virtual environment database 760, and user profile and authentication dataset 762, which are described below in more details.

Processing Mechanism Database 754. Any applicable mechanisms may be stored in processing mechanism database 754. Such mechanisms are not limited to those for captured signal data. Additional mechanisms such as those used for processing virtual environment or post-production processing of the integrated images or videos can also be stored in processing mechanism database 754.

Context Database 756. In some embodiments, remote data server 700 hosts a context database 756. Context database 756 stores and organizes context related data such as date and time information, communication context, content context, advertiser context, geolocation context, presentation context, or combinations thereof time, weather, location-related events, history, map, and news and etc. The information here can provide context information when the server selects appropriate advertisement content for a user. In some embodiments, trending data including recent popular queries, events, domain knowledge and other related information can be used to as context information. The information can be real-time updated to provide context information when the server selects appropriate advertisement content for a user.

Advertiser Database 758. As disclosed herein, information associated or specified by advertisers is stored in advertiser database 758. In some embodiments, an advertiser can specify preference for certain platform. In some embodiments, an advertiser can set pricing information for participating in bidding processes.

Virtual Environment Database 760. In some embodiments, virtual environment or images/videos for constructing such virtual environment are stored in virtual environment database 760. Additionally, a user's past preference for one or more types of modification can be used to guide and help modify future virtual environment. In some embodiments, previous preferences for virtual environment or modifications and variations thereof may be stored and organization in connection with the corresponding user profiles (e.g., from user profile database 762), thus providing user-specific advertisement content.

User Profile Database 762. In some embodiments in accordance with the present invention, a user profile database 762 may be created and stored on remote data server 700 where passwords and authentication data concerning the users are stored and managed. In some embodiments, users are given the opportunity to choose security settings. In some embodiments, user preference information is also included in user profile database. Exemplary user preference information includes but is not limited to user specified information, user biographical information, user behavior information, user activities, user psychological status, user social status, user real-time request information, or combinations thereof.

The present invention can be implemented as a computer system and/or a computer program product that comprises a computer program mechanism embedded in a computer readable storage medium. Further, any of the methods of the present invention can be implemented in one or more computers or computer systems. Further still, any of the methods of the present invention can be implemented in one or more computer program products. Some embodiments of the present invention provide a computer system or a computer program product that encodes or has instructions for performing any or all of the methods disclosed herein. Such methods/instructions can be stored on a CD-ROM, DVD, magnetic disk storage product, flash drive, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer system or a computer program product that contains any or all of the program modules as disclosed herein. These program modules can be stored on a CD-ROM, DVD, flash drive, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In closing, it is to be understood that the embodiments of the invention disclosed herein are illustrative of the principles of the present invention. Other modifications that can be employed can be within the scope of the invention. Thus, by way of example, but not of limitation, alternative configurations of the present invention can be utilized in accordance with the teachings herein. Accordingly, embodiments of the present invention are not limited to that precisely as shown and described.

I claim:

1. A method of integrating a real life object with a virtual environment, comprising:
   extracting, on a remote server and in real time, image information of at least one real life object that has been captured in real-time based on a comprehensive characteristic-based mechanism by separating the real life object from its actual environment, resulting in multi-dimensional image information of the real life object;
   generating, on the remote server and in real-time, image relations between each pixel of the image information of the real life object and a corresponding pixel of each image of a plurality of images of a virtual environment comprising a plurality of elements, wherein the image relations comprise at least a depth relation or a transparency relation;
   integrating, at the remote server in real time and on a pixel by pixel basis, the image information of the real life object and each image of the plurality of images of the virtual environment based on the image relations to create the plurality of integrated images; and
   sending, to a user device and in real-time, a plurality of integrated images, wherein each pixel in an integrated image is divided into multiple layers, and wherein each layer is determined using corresponding pixels in the image information of the real life object and each image of the plurality of images of the virtual environment based on the image relations;
   wherein in a region of an integrated image corresponding to the real life object,
      at least one pixel associated with the real life object is rendered invisible based on the determination based on the image relations between the real life object and the plurality of images of the virtual environment,
      at least one pixel associated with the virtual environment is rendered invisible based on the determination based on the image relations between the real life object and the plurality of images of the virtual environment, and
      at least a portion of the real life object interacts with one or more elements of the virtual environment,
      wherein the comprehensive characteristic-based mechanism is based on at least one visual characteristic of either the real life object or the actual environment, and
      wherein the visual characteristic is one of captured by a computer device in a video clip, a real-time learned characteristic of the computer device, or a pre-learned feature of the computer device.

2. The method of claim 1, wherein the remote server receives a collection of virtual environments from the user device.

3. The method of claim 1, wherein the comprehensive characteristic-based mechanism is based on one or more differences in a characteristic between the real life object and the actual environment, the characteristic comprising a visual characteristic of the real life object or the actual environment captured in the video clip, a real-time learned characteristic of the real life object or the actual environment, or a pre-learned feature relating to the real life object or the actual environment.

4. The method of claim 3, wherein the visual characteristic comprises a spatial characteristic, a size characteristic, a shape characteristics, a motion characteristics, a color characteristic, a light illuminance and reflectance characteristic, a temporal characteristic, or a transparency characteristic, a depth characteristic, a material characteristic, or a combinations thereof.

5. The method of claim 4, wherein the spatial characteristic comprises a three-dimensional spatial characteristic.

6. The method of claim 3, wherein the real-time learned characteristic comprises color, shape, edge, light reflectance, light illuminance, exposure, brightness, shadow, highlight, contrast, blackpoint, motion, depth, material, contrast, or combinations thereof.

7. The method of claim 3, wherein the pre-learned feature comprises color, shape, edge, light reflectance, light illuminance, exposure, brightness, shadow, highlight, contrast, blackpoint, motion, depth, material, contrast, or combinations thereof.

8. The method of claim 1, further comprising:
   determining, on a pixel-by-pixel basis, a first portion of the real life object that obscures a corresponding portion of one element of the virtual environment, and
   determining, on a pixel-by-pixel basis, a second portion of the real life object that is obscured by a corresponding portion of the one element of the virtual environment,
   such that the real life object is rendered partially in front of and partially behind the one element of the virtual environment.

9. The method of claim 2, wherein the collection of virtual environments is divided into categories based on themes.

10. The method of claim 1, wherein at least one image of the plurality of images is modified when being used to construct the virtual environment.

11. The method of claim 10, wherein the at least one image is modified in size, shape, image quality, color, light, perspective, visual effect, or combinations thereof.

12. The method of claim 9, wherein the themes can be any one or more of: nature, animals, space, movie, architecture, culture, and travel.

13. A method of integrating two real life objects with a virtual environment, comprising:
   extracting, on a remote server and in real time, image information of a first real life object that has been captured in real-time based on a comprehensive characteristic-based mechanism by separating the first real life object from its actual environment, resulting in multi-dimensional image information of the first real life object;
   extracting, on a remote server and in real time, image information of a second real life object that has been captured in real-time based on a comprehensive characteristic-based mechanism by separating the second real life object from its actual environment, resulting in multi-dimensional image information of the second real life object;

generating, on the remote server and in real-time, image relations between each pixel of the image information of the first real life object and a corresponding pixel of each image of a plurality of images of a virtual environment, wherein the image relations comprise at least a depth relation or a transparency relation;

generating, on the remote server and in real-time, new image relations between each pixel of the image information of the second real life object and a corresponding pixel of each image of the plurality of images of the virtual environment, wherein the image relations comprise at least a depth relation or a transparency relation;

integrating, at the remote server in real time and on a pixel by pixel basis, the image information of the first real life object, the second real life object, and each image of the plurality of images of the virtual environment based on the image relations to create the plurality of integrated images; and sending, to a user device and in real-time, a plurality of integrated images, wherein each pixel in an integrated image is divided into multiple layers, and wherein each layer is determined using corresponding pixels in the image information of the real life object and each image of the plurality of images of the virtual environment based on the image relations;

wherein in a region of an integrated image corresponding to either the first real life object or the second real life object:
- at least one pixel associated with the real life object is rendered invisible based on the determination based on the image relations between the real life object and the plurality of images of the virtual environment,
- at least one pixel associated with the virtual environment is rendered invisible based on the determination based on the image relations between the real life object and the plurality of images of the virtual environment, and
- at least a portion of the real life object interacts with one or more elements of the virtual environment;
- wherein the comprehensive characteristic-based mechanism is based on at least one visual characteristic of either the real life object or the actual environment, and
- wherein the visual characteristic is one of: captured by the computer device in a video clip, a real-time learned characteristic of the computer device, or a pre-learned feature of the computer device.

14. A computer system comprising:
one or more processors; and
a memory accessible to the one or more processors, the memory storing instructions executable by the one or more processors to:
extract, on a remote server, image information of at least one real life object that has been captured in real-time based on a comprehensive characteristic-based mechanism by separating the real life object from its actual environment, resulting in multi-dimensional image information of the real life object;
generate, on the remote server and in real time, image relations between each pixel of the image information of the real life object and a corresponding pixel of each image of a plurality of images of a virtual environment comprising a plurality of elements, wherein the image relations comprise at least a depth relation or a transparency relation;

integrate, at the remote server and in real time and on a pixel by pixel basis, the image information of the real life object and each image of the plurality of images of the virtual environment based on the image relations to create the plurality of integrated images; and send, to a user device and in real-time, a plurality of integrated images, wherein each pixel in an integrated image is divided into multiple layers, and wherein each layer is determined using corresponding pixels in the image information of the real life object and each image of the plurality of images of the virtual environment based on the image relations;

wherein in a region of an integrated image corresponding to the real life object,
- at least one pixel associated with the real life object is rendered invisible based on the determination based on the image relations between the real life object and the plurality of images of the virtual environment,
- at least one pixel associated with the virtual environment is rendered invisible based on the determination based on the image relations between the real life object and the plurality of images of the virtual environment, and
- at least a portion of the real life object interacts with one or more elements of the virtual environment,
- wherein the comprehensive characteristic-based mechanism is based on at least one visual characteristic of either the real life object or the actual environment, and
- wherein the visual characteristic is one of captured by a computer device in a video clip, a real-time learned characteristic of the computer device, or a pre-learned feature of the computer device.

15. The computer system of claim 14, wherein the memory stores further instructions executable by the one or more processors to receive a collection of virtual environments from the user device.

16. The computer system of claim 14, wherein the memory stores further instructions executable by the one or more processors to construct the virtual environment from the plurality of images.

17. The computer system of claim 14, wherein the memory stores further instructions executable by the one or more processors to:
generate new image relations between each pixel of the image information of a second real life object and a corresponding pixel of each image of the plurality of images, wherein the new image relations comprise at least a depth relation or a transparency relation.

18. A non-transitory computer-readable medium containing instructions that, when executed by a computer processor, cause the computer processor to:
extract, on a remote server, image information of at least one real life object that has been captured in real-time based on a comprehensive characteristic-based mechanism by separating the real life object from its actual environment, resulting in multi-dimensional image information of the real life object;
generate, on the remote server and in real time, image relations between each pixel of the image information of the real life object and a corresponding pixel of each image of a plurality of images of a virtual environment comprising a plurality of elements, wherein the image relations comprise at least a depth relation or a transparency relation;

integrate, at the remote server and in real time and on a pixel by pixel basis, the image information of the real life object and each image of the plurality of images of the virtual environment based on the image relations to create the plurality of integrated images; and send, to a user device and in real-time, a plurality of integrated images, wherein each pixel in an integrated image is divided into multiple layers, and wherein each layer is determined using corresponding pixels in the image information of the real life object and each image of the plurality of images of the virtual environment based on the image relations;

wherein in a region of an integrated image corresponding to the real life object, at least one pixel associated with the real life object is rendered invisible based on the determination based on the image relations between the real life object and the plurality of images of the virtual environment, at least one pixel associated with the virtual environment is rendered invisible based on the determination based on the image relations between the real life object and the plurality of images of the virtual environment, and at least a portion of the real life object interacts with one or more elements of the virtual environment, wherein the comprehensive characteristic-based mechanism is based on at least one visual characteristic of either the real life object or the actual environment, and wherein the visual characteristic is one of captured by a computer device in a video clip, a real-time learned characteristic of the computer device, or a pre-learned feature of the computer device.

19. The non-transitory computer-readable medium of claim 18, wherein the non-transitory computer-readable medium contains further instructions executable by the one or more processors to:

construct, at the computer device or a different computer device, the virtual environment from the plurality of images.

20. The non-transitory computer-readable medium of claim 18, wherein the non-transitory computer-readable medium contains further instructions executable by the one or more processors to:

generate, on the remote server and in real-time, new image relations between each pixel of the image information of a second real life object and a corresponding pixel of each image of the plurality of images, wherein the new image relations comprise at least a depth relation or a transparency relation.

* * * * *